(12) United States Patent
Balasubramanian et al.

(10) Patent No.: US 12,395,286 B2
(45) Date of Patent: Aug. 19, 2025

(54) MULTI-TRANSMISSION AND RECEPTION POINT (MULTI-TRP) BASED POSITIONING

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Gabi Sarkis, San Diego, CA (US); Dan Vassilovski, Del Mar, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/885,198

(22) Filed: Aug. 10, 2022

(65) Prior Publication Data
US 2024/0056245 A1 Feb. 15, 2024

(51) Int. Cl.
*H04L 5/00* (2006.01)
*G01S 5/10* (2006.01)

(52) U.S. Cl.
CPC .............. *H04L 5/0035* (2013.01); *G01S 5/10* (2013.01); *H04L 5/0051* (2013.01)

(58) Field of Classification Search
CPC ....... G01S 5/10; H04L 5/0035; H04L 5/0051; H04W 4/40; H04W 64/00; H04W 76/14; H04W 88/02; H04W 88/085; H04W 92/18

(Continued)

(56) References Cited

U.S. PATENT DOCUMENTS

2022/0085945 A1* 3/2022 Manolakos ........... H04L 5/0051
2022/0386093 A1* 12/2022 Baek ...................... H04W 56/00

(Continued)

FOREIGN PATENT DOCUMENTS

WO WO-2021222624 A1 11/2021
WO WO-2022047741 A1 3/2022

OTHER PUBLICATIONS

3GPP TS 38.300: "3rd Generation Partnership Project, Technical Specification Group Radio Access Network, NR, NR and NG-RAN Overall Description, Stage 2 (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 19, 2022, pp. 1-209, XP052183752, chapters 3.2, 5.22.6, 5.3.6, 5.7, 6.12, 8.4, 16.9, 16.12.

(Continued)

*Primary Examiner* — Robert J Lopata
(74) *Attorney, Agent, or Firm* — Norton Rose Fulbright US LLP

(57) ABSTRACT

This disclosure provides systems, methods, and devices for wireless communication that support multiple-transmission and reception point (multi-TRP) based positioning. In some aspects, a method includes transmitting, by a first user equipment (UE) including a first set of transmission and reception points (TRPs), a first request for a first sidelink (SL) positioning session. The first request indicates a multi-TRP positioning session is enabled. The method also includes receiving, from a second UE including a second set of TRPs, a first response based on the first request. The first response indicates a number of TRPs of the second set of TRPs available for the first SL positioning session. Other aspects and features are also claimed and described.

26 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2023/0127796 | A1* | 4/2023 | Vassilovski | H04L 5/0053 |
| | | | | 370/329 |
| 2024/0057027 | A1* | 2/2024 | Edge | H04W 76/14 |
| 2024/0188153 | A1* | 6/2024 | Hoang | G01S 5/0072 |
| 2024/0334371 | A1* | 10/2024 | Manolakos | H04W 64/00 |
| 2024/0389068 | A1* | 11/2024 | Yerramalli | G01S 5/0249 |

OTHER PUBLICATIONS

3GPP TS 38.305: "3rd Generation Partnership Project, Technical Specification Group Radio Access Network, NG Radio Access Network (NG-RAN), Stage 2 functional Specification of User Equipment (UE) positioning in NG-RAN (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 18, 2022, pp. 1-133, XP052183737.
International Search Report and Written Opinion—PCT/US2023/067504—ISA/EPO—Sep. 4, 2023.
Qualcomm Incorporated: "Potential Solutions for Sidelink Positioning", 3GPP TSG RAN WG1 #109-e, R1-2205038, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052191702, 11 pages, chapters 2-9.

* cited by examiner

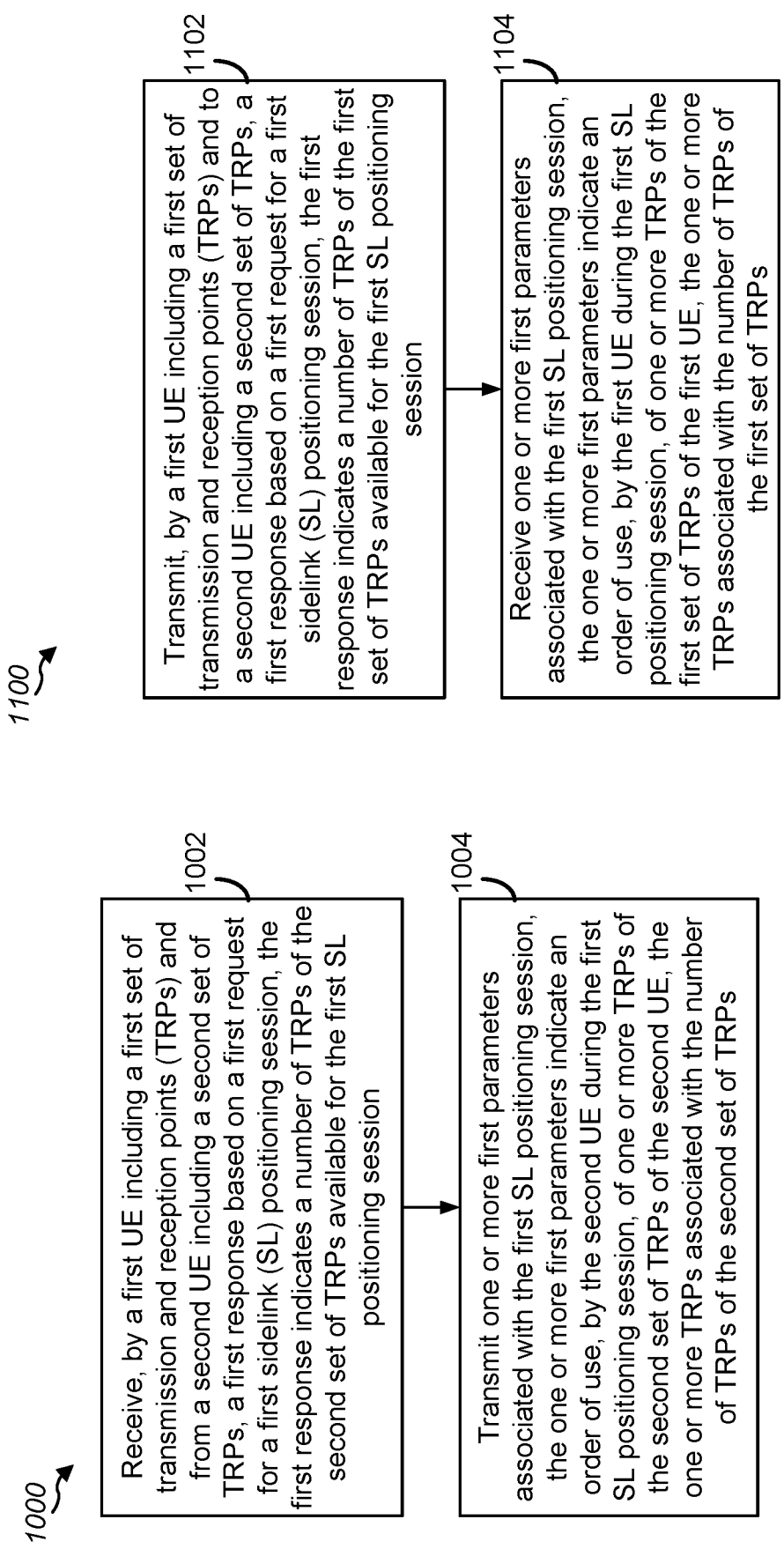

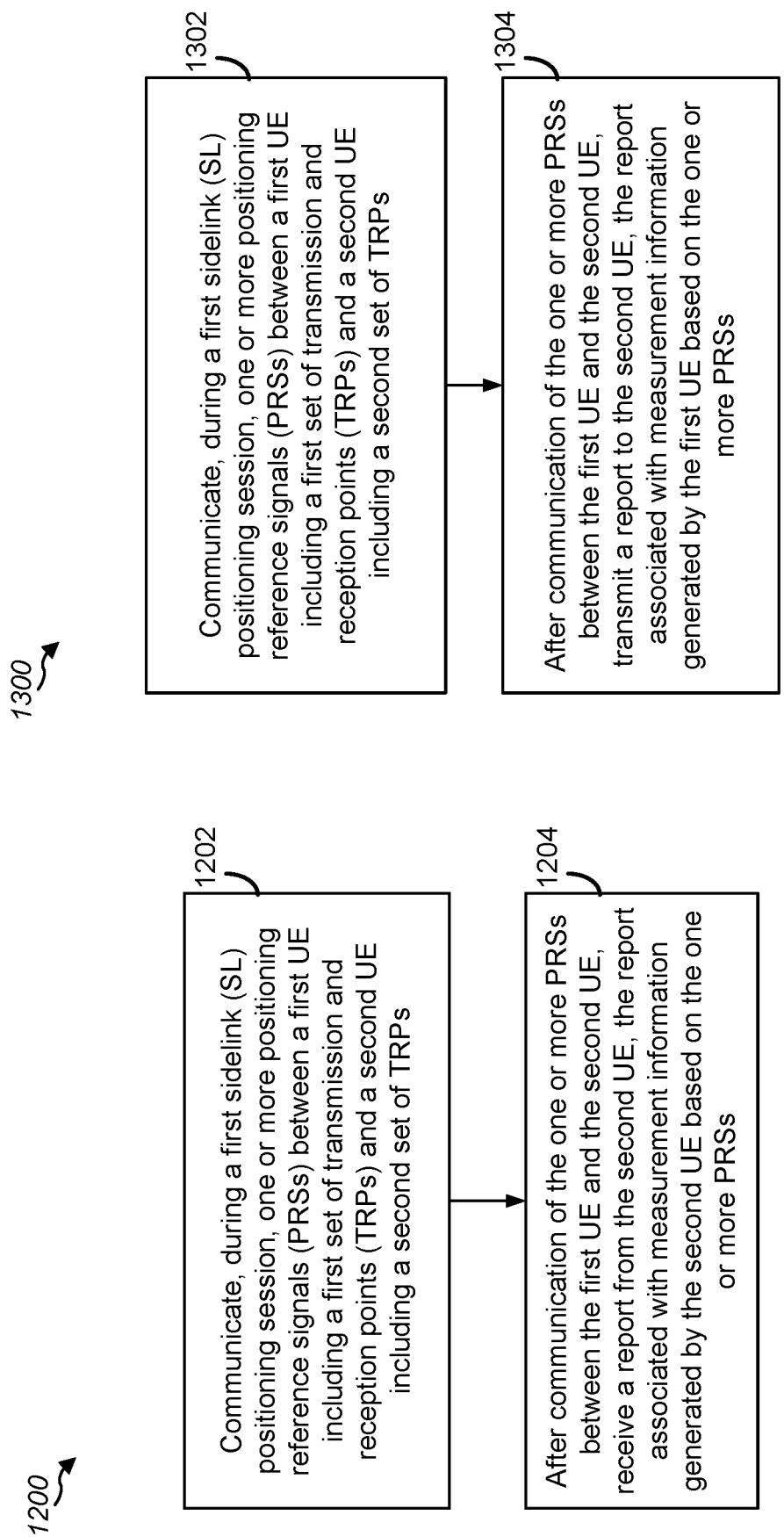

MULTI-TRANSMISSION AND RECEPTION POINT (MULTI-TRP) BASED POSITIONING

TECHNICAL FIELD

Aspects of the present disclosure relate generally to wireless communication systems, and more particularly, to a transmission and reception point (TRP) based positioning, such as multi-TRP (mTRP) based sidelink (SL) positioning. Some features may enable and provide improved ranging measurements, location determinations, TRP selection, Intelligent Transport Systems (ITSs), or a combination thereof, as illustrative, non-limiting examples.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

With the introduction of 5$^{th}$ Generation (5G) or new radio (NR) networks (sometimes referred to as "5G NR" networks/systems/devices), UEs are able to have higher capability, higher data rate, higher bandwidth. Additionally, UEs are also able to operate in a variety of architectures that provide dual connectivity. Further, 5G provides parameters to improve accuracy of determining positioning of UEs, such as in Uu positioning or sidelink (SL) positioning. However, application of such positioning techniques have not been applied to dynamic systems, such as an intelligent transport system (ITS), or to devices that include multiple transmission and reception points. Additionally, as devices continue to improve and "do more", networks and devices of the network may experience increased network congestion, overhead, and interferences associated with determining positioning information of devices within a network, such as when multiple devices are densely co-located.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a first user equipment (UE) includes transmitting, by a first user equipment (UE) including a first set of transmission and reception points (TRPs), a first request for a first sidelink (SL) positioning session. The first request indicates a multi-TRP (mTRP) positioning session is enabled. The method also includes receiving, from a second UE including a second set of TRPs, a first response based on the first request. The first response indicates a number of TRPs of the second set of TRPs available for the first SL positioning session.

In an additional aspect of the disclosure, an apparatus includes a first set of TRPs, at least one processor, and a memory coupled to the at least one processor. The at least one processor is configured to transmit, via the first set of TRPs, a first request for a first SL positioning session. The first request indicates a multi-TRP (mTRP) positioning session is enabled. The at least one processor is also configured to receive, via the first set of TRPs and from a first UE including a second set of TRPs, a first response based on the first request. The first response indicates a number of TRPs of the second set of TRPs available for the first SL positioning session.

In an additional aspect of the disclosure, an apparatus includes means for generating a first request for a first SL positioning session. The first request indicates an mTRP positioning session is enabled. The apparatus also includes a first set of means for transmitting and receiving SL positioning information. At least one of the first set of means for transmitting and receiving is configured to transmit the first request, and receive, from a UE including a set of TRPs, a first response based on the first request. The first response indicates a number of TRPs of the set of TRPs available for the first SL positioning session.

In an additional aspect of the disclosure, a non-transitory computer-readable medium stores instructions that, when executed by a processor, cause the processor to perform operations. The operations include transmitting, by a first UE including a first set of TRPs, a first request for a first SL positioning session. The first request indicates an mTRP positioning session is enabled. The operations also include receiving, from a second UE including a second set of TRPs, a first response based on the first request. The first response indicates a number of TRPs of the second set of TRPs available for the first SL positioning session.

In an additional aspect of the disclosure, a method for wireless communication performed by a first UE includes receiving, by the first UE including a first set of TRPs, a first request for a first SL positioning session from a second UE including a second set of TRPs. The first request indicates an mTRP positioning session is enabled. The method also includes transmitting, to the second UE, a first response based on the first request, the first response indicates a number of TRPs of the first set of TRPs available for the first SL positioning session.

In an additional aspect of the disclosure, an apparatus includes a first set of TRPs, at least one processor, and a memory coupled to the at least one processor. The at least one processor is configured to receive, by the first UE including a first set of TRPs, a first request for a first SL positioning session from a second UE including a second set of TRPs. The first request indicates an mTRP positioning session is enabled. The at least one processor is configured to transmit, to the second UE, a first response based on the first request, the first response indicates a number of TRPs of the first set of TRPs available for the first SL positioning session.

In an additional aspect of the disclosure, an apparatus includes a first set of means for transmitting and receiving SL positioning information. At least one of the first set of means for transmitting and receiving is configured to receive a first request for a first SL positioning session from a UE including a set of TRPs. The first request indicates an mTRP positioning session is enabled. The apparatus further includes means for generating a first response based on the first request. The first response indicates a number of TRPs of the first set of TRPs available for the first SL positioning session.

In an additional aspect of the disclosure, a non-transitory computer-readable medium stores instructions that, when executed by a processor, cause the processor to perform operations. The operations include receiving, by the first UE including a first set of TRPs, a first request for a first SL positioning session from a second UE including a second set of TRPs. The first request indicates an mTRP positioning session is enabled. The operations further include transmitting, to the second UE, a first response based on the first request, the first response indicates a number of TRPs of the first set of TRPs available for the first SL positioning session.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a flow diagram illustrating an example process that supports multi-TRP based positioning according to one or more aspects.

FIG. 11 is a flow diagram illustrating an example process that supports multi-TRP based positioning according to one or more aspects.

FIG. 12 is a flow diagram illustrating an example process that supports multi-TRP based positioning according to one or more aspects.

FIG. 13 is a flow diagram illustrating an example process that supports multi-TRP based positioning according to one or more aspects.

Like reference numbers and designations in the various drawings indicate like elements.

DETAILED DESCRIPTION

Figure 1:
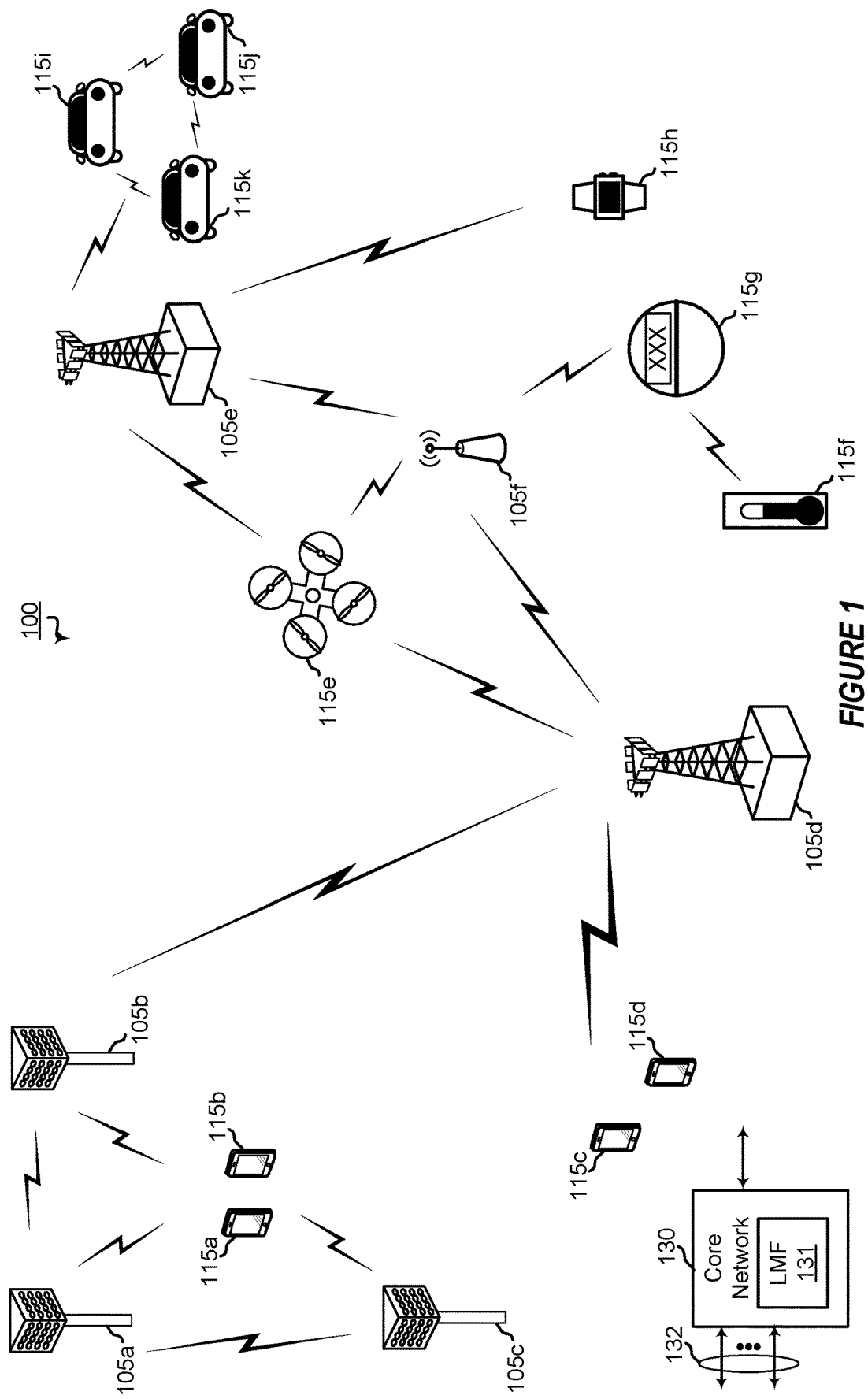
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support multi-transmission and reception point (multi-TRP) based positioning, such as multi-TRP based sidelink (SL) positioning. A multi-TRP positioning session may include a positioning session that includes at least two devices and in which multiple TRPs of at least one of the two devices is used during the positioning session to transmit or receive a positioning reference signal as part of the positioning session. In some implementations, a first user equipment includes a first set of transmission and reception points (TRPs) and a second UE includes a second set of TRPs. The first UE may transmit a request for a positioning session, such as an SL positioning session, and the request may indicate a multi-TRP (mTRP) positioning session is enabled. The first UE may receive, from the second UE, a response based on the request. The response may indicate a number of TRPs of the second set of TRPs available for the positioning session. The first UE may transmit one or more parameters (associated with the positioning session) that indicate an order of use, by the second UE during the first SL positioning session, of one or more TRPs of the second set of TRPs of the second UE. Additionally, or alternatively, the one or more parameters may indicate a schedule of one or more positioning reference signals (PRSs), a report format of one or more measurements associated with the PRSs of the positioning session, or a combination thereof. After transmission of the one or more parameters, one or more PRSs may be communicated between the first UE and the second UE.

Based on the one or more PRSs, the first UE and the second UE may determine measurement information, such as a PRS transmit time or a PRS receive time. The first UE may transmit, to the second UE, a first report that includes measurement information of the first UE. Additionally, the second UE may transmit, to the first UE, a second report that includes measurement information of the second UE. In some implementations, if the first UE includes MTRPs (where M is a positive integer) and the second UE includes N TRPs (where N is a positive integer) that are used during the positioning session, the second report may include M*N time difference measurements, may provide a first K measurements (where K is a positive integer and $1 \le K \le M*N$) associated with the highest reference signal received power (RSRP), provide Q measurements (where Q is a positive integer and $1 \le Q \le M*N$) with a line-of-sight (LoS) between the first UE and the second UE, or any combination thereof. Based on the second report, the first UE may determine a distance between the first UE and the second UE, determine a distance between a TRP of the first UE and a TRP of the second UE, a position of the first UE or the second UE, or a combination thereof.

Particular implementations of the subject matter described in this disclosure may be implemented to realize one or more of the following potential advantages or benefits. In some aspects, the present disclosure provides techniques for multi-TRP based positioning, such as multi-TRP based SL positioning. The multi-TRP based positioning may enable two UEs that do not have knowledge of their position/location or have inaccurate knowledge of their position, to determine an inter-UE range between the two UEs based on measurements associated with the positioning session. Additionally, if one UE has accurate knowledge of its position, the range determined between the two UEs based on the multi-TRP based positioning can correspond to an absolute position.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
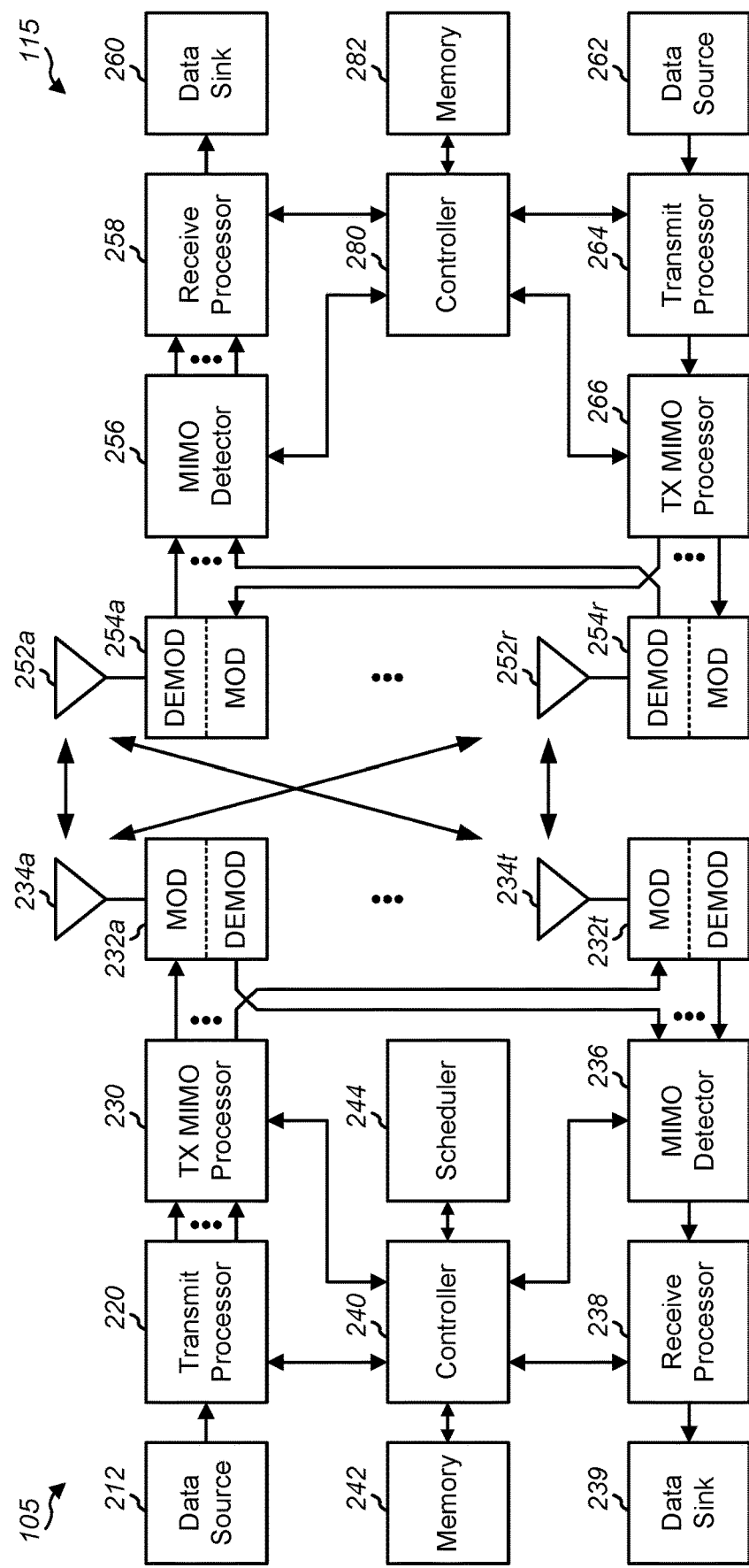
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8-13, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (TAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 3:
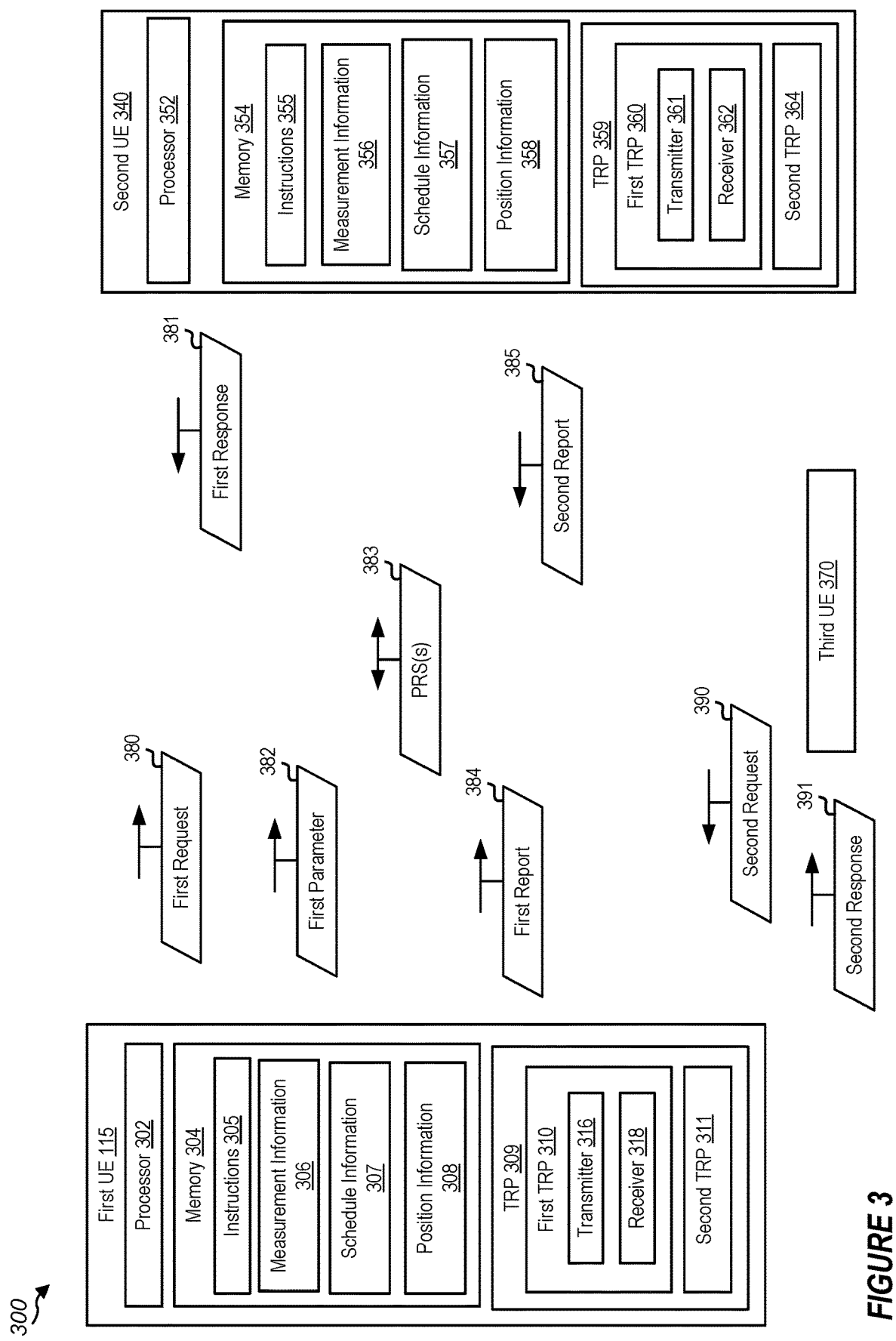
FIG. 3 is a block diagram illustrating an example wireless communication system that supports multiple-transmission and reception point (multi-TRP) based positioning according to one or more aspects.

FIG. 3 is a block diagram of an example wireless communications system 300 that supports multi-TRP based positioning according to one or more aspects. In some examples, wireless communications system 300 may implement aspects of wireless network 100. Wireless communications system 300 includes a first UE, such as UE 115, a second UE 340, and a third UE 370. Although three UEs are illustrated, in some other implementations, wireless communications system 300 may generally include one or more UEs. In some implementations, wireless communication system 300 includes an intelligent transport system (ITS).

In some implementations, wireless communications system 300 may include or correspond to an intelligent transport system (ITS). Additionally, or alternatively, one or more of first UE 115, second UE 340, or third UE 370 may include a device or entity of or associated with wireless communications system 300. For example, one or more of first UE 115, second UE 340, or third UE 370 may include a smart phone, a vehicle, a roadside unit (RSU), an onboard unit (OBU), a modem, or a combination thereof, as illustrative, non-limiting examples. In some implementations, at least one of first UE 115, second UE 340, or third UE 370 includes multiple TRPs.

First UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), and one or more TRP (herein referred to collectively as "TRP 309"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 305, measurement information 306, schedule information 307, and position information 308. Instructions 305 may include or correspond to instructions, that when executed by processor 302, cause processor 302 to perform one or more operations, such as one or more wireless communication operations. In some implementations, the one or more operations may include or correspond to SL communication, such as a SL positioning session. Additionally, or alternatively, it is noted that a UE, such as first UE 115, may participate in multiple ranging sessions simultaneously.

Measurement information 306 may include or correspond to a time measurement, a time difference measurement, a signal strength measurement, a reference signal received power (RSRP), or a combination thereof, as illustrative, non-limiting examples. In some implementations, a time different measurement may include or correspond to a difference between a transmit time of a first positioning reference signal and a receive time of a second positioning reference signal, or a difference between a receive time of the first positioning reference signal and a transmit time of the second positioning reference signal. In some implementations, measurement information 306 may include or indicate a distance, a range, or a location associated with a UE, a TRP, or a combination thereof.

Schedule information 307 may include or correspond to a schedule or assignment of one or more frequency resources, one or more time resources, or a combination thereof. In some implementations, schedule information may be associated with transmission or reception of one or more PRS resources for one or more TRPs of first UE 115, second UE 340, third UE 370, or a combination thereof.

Position information 308 may include or indicate a location or position of a TRP, a location or a position of a UE, or a combination thereof. Additionally, or alternatively, position information 308 may include ranging information, such as a distance between two objects or device. For example, the ranging information may include or indicate a distance between positions or locations of two UEs, between positions or locations of two TRPS, between a position or location of a UE and a position or location of a TRP.

TRP 309 includes a first TRP 310 and a second TRP 311. Although described as including two TRPs, in other implementations, TRP 309 may include a single TRP or more than two TRPs, such as three TRPs, four TRPs, etc.

Each TRP of TRP 309 may include a transmitter, a receiver, or a combination thereof. In some implementations, each TRP of TRP 309 includes a transmitter and a receiver. As a representative example, first TRP 310 includes a transmitter 316, and a receiver 318. Transmitter 316 is configured to transmit reference signals, control information, data, or a combination thereof to one or more other devices, and receiver 318 is configured to receive references signals, synchronization signals, control information, data, or a combination thereof from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

In some implementations, first UE 115 may include a vehicle and first TRP 310 and second TRP 311 may be located in different portions of the vehicle. As an illustrative, non-limiting example, first TRP 310 may be located at a front portion of the vehicle and second TRP 311 may be located at a rear portion of the car. As another illustrative, non-limiting example, first TRP 310 may be located at a driver side portion, such as a front driver side portion, of the vehicle and second TRP 311 may be located at a passenger side portion, such as a front passenger side portion, of the vehicle.

Second UE 340 may include a variety of components (such as structural, hardware components) used for carrying out one or more functions described herein. For example, these components may include one or more processors 352

(hereinafter referred to collectively as "processor 352"), one or more memory devices 354 (hereinafter referred to collectively as "memory 354"), and one or more TRP (herein referred to collectively as "TRP 359"). Processor 352 may be configured to execute instructions stored in memory 354 to perform the operations described herein. In some implementations, processor 352 includes or corresponds to one or more of receive processor 258, transmit processor 264, and controller 280, and memory 354 includes or corresponds to memory 282.

Memory 304 includes or is configured to store instructions 355, measurement information 356, schedule information 357, and position information 358. Instructions 355 may include or correspond to instructions, that when executed by processor 352, cause processor 352 to perform one or more operations, such as one or more wireless communication operations. In some implementations, the one or more operations may include or correspond to SL communication, such as a SL positioning session.

Measurement information 356 may include or correspond to a time measurement, a time difference measurement, a signal strength measurement, a reference signal received power (RSRP), or a combination thereof, as illustrative, non-limiting examples. In some implementations, a time different measurement may include or correspond to a difference between a transmit time of a first positioning reference signal and a receive time of a second positioning reference signal, or a difference between a receive time of the first positioning reference signal and a transmit time of the second positioning reference signal. In some implementations, measurement information 356 may include or indicate a distance, a range, or a location associated with a UE, a TRP, or a combination thereof Schedule information 357 may include or correspond to a schedule or assignment of one or more frequency resources, one or more time resources, or a combination thereof. In some implementations, schedule information may be associated with transmission or reception of one or more PRS resources for one or more TRPs of first UE 115, second UE 340, third UE 370, or a combination thereof.

Position information 358 may include or indicate a location or position of a TRP, a location or a position of a UE, or a combination thereof. Additionally, or alternatively, position information 358 may include ranging information, such as a distance between two objects or device. For example, the ranging information may include or indicate a distance between positions or locations of two UEs, between positions or locations of two TRPS, between a position or location of a UE and a position or location of a TRP.

TRP 359 includes a first TRP 360 and a second TRP 364. Although described as including two TRPs, in other implementations, TRP 359 may include a single TRP or more than two TRPs, such as three TRPs, four TRPs, etc.

Each TRP of TRP 359 may include a transmitter, a receiver, or a combination thereof. In some implementations, each TRP of TRP 359 includes a transmitter and a receiver. As a representative example, first TRP 360 includes a transmitter 361, and a receiver 362. Transmitter 361 is configured to transmit reference signals, control information, data, or a combination thereof to one or more other devices, and receiver 362 is configured to receive references signals, synchronization signals, control information, data, or a combination thereof from one or more other devices. For example, transmitter 361 may transmit signaling, control information and data to, and receiver 362 may receive signaling, control information and data from, base station 105. In some implementations, transmitter 361 and receiver 362 may be integrated in one or more transceivers. Additionally or alternatively, transmitter 361 or receiver 362 may include or correspond to one or more components of UE 115 described with reference to FIG. 2.

In some implementations, second UE 340 may include a vehicle and first TRP 360 and second TRP 364 may be located in different portions of the vehicle. As an illustrative, non-limiting example, first TRP 360 may be located at a front portion of the vehicle and second TRP 364 may be located at a rear portion of the car. As another illustrative, non-limiting example, first TRP 360 may be located at a driver side portion, such as a front driver side portion, of the vehicle and second TRP 364 may be located at a passenger side portion, such as a front passenger side portion, of the vehicle.

Third UE 370 may include a variety of components (such as structural, hardware components) used for carrying out one or more functions described herein. For example, third UE 370 may include one or more components as described here at least with reference to UE 115, second UE 340, or a combination thereof.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, first UE 115 may generate a first request 380 for a first positioning session, such as a first SL positioning session. In some implementations, first request 380 may indicate a multi-TRP positioning session is enabled. For example, first request 380 may include a field or bit that is associated with or indicates that the multi-TRP positioning session is enabled. First UE 115 transmits first request 380 to one or more UEs, such as second UE 340, third UE 370, or a combination thereof.

Second UE 340 may receive first request 380 and determine, based on first request 380, that the multi-TRP positioning session is enabled. Based on first request 380 or a determination that the multi-TRP positioning session is enabled, second UE 340 may determine a number of TRPs, of TRPs 369, that are available for a positioning session, such as a SL positioning session.

Additionally, or alternatively, based on first request 380, second UE 340 may generate a first response 381. First response 381 may indicate the number of available TRPs for the positioning session, a location or ID of at least one TRP of TRPs 369, a position of second UE 340, a motion state indicator (e.g., a static state or a dynamic state), or a combination thereof. Second UE 340 may transmit first response 381. For example, second UE 340 may transmit first response 381 to first UE 115.

First UE 115 receives first response 381 In some implementations, based on first response 381, first UE 115 may determine the number of available TRPs of second UE 340, identify an ID or location of each available TRP of second UE 340, identify the position of second UE 340, a motion state, or a combination thereof.

First UE 115 may generate one or more first parameters (hereinafter referred to collectively as a "first parameter 382") associated with the positioning session. For example, first parameter 382 may indicate an order of use, by second UE 340 during the positioning session, of one or more TRPs of TRP 359 of second UE 340. The one or more TRPs may be associated with or correspond to the number of available TRPs of second UE 340 second set of TRPs. Additionally, or alternatively, first parameter 382 may include or indicate one or more session parameters, such as a frequency resource or time resource assignment for each TRP included in the order. In some implementations, a PRS carrier may be included in an unlicensed band. The unlicensed band may be region/country-specific. First UE 115 may select the PRS carrier based on a pre-configuration, a configuration, a location (e.g., PLMN, GNSS), or a combination thereof. In some implementations, first parameter 382 may include a PRS carrier indication that includes or indicates an index to pre-defined bands. Additionally, or alternatively, first parameter 382 may indicate a report format associated with measurement information, such as the measurement information based on one or more PRSs between first UE 115 and second UE 340 during the positioning session. Additionally, or alternatively, first parameter 382 may indicate whether or not the positioning session is periodic. In some implementations, first parameter 382 may include or be associated with schedule information 307. First UE 115 may transmit first parameter 382. For example, UE may transmit first parameter 382 to second UE 340.

Second UE 340 may receive first parameter 382. Second UE 340 may determine, based on first parameter 382, the order of use of the one or more TRPs, scheduling information, the report format, or a combination thereof. In some implementations, second UE 340 may, based on first parameter 382, transmit an additional response in which second UE 340 indicates that second UE 340, or at least one TRP of second UE 340, will participate in the positioning session.

After first UE 115 transmits first parameter 382 and second UE 340 receives first parameter 382, first UE 115 and second UE 340 may communicate one or more PRSs 383 between first UE 115 and second UE 340. To illustrate, first TRP 310 of first UE 115 and first TRP 360 of second UE 340 may communicate a first PRS to generate PRS measurements. As another example, first TRP 310 of first UE 115 and second TRP 364 of second UE 340 may communicate a second PRS to generate PRS measurements. As another example, second TRP 311 of first UE 115 and first TRP 360 of second UE 340 may communicate a third PRS to generate PRS measurements. As another example, second TRP 311 of first UE 115 and first TRP 360 of second UE 340 may communicate a third PRS to generate PRS measurements.

After communication of the one or more PRSs 383 between first UE 115 and second UE 340, first UE 115 may generate a first report 384. For example, first report 384 may be associated with measurement information, such as measurement information 306, generated by first UE 115 based on one or more PRSs 383. In some implementations, first report 384 may be generated based on the report format indicated by first UE 115 to second UE 340. In some implementations, first report 384 may include the measurement information, a location of first UE 115, a motion station of first UE 115, or a combination thereof. First UE 115 may transmit first report 384 to second UE 340. For example, first UE 115, after communication of one or more PRSs 383 between first UE 115 and second UE 340, may transmit first report 384 to second UE 340.

Additionally, or alternatively, after communication of the one or more PRSs 383 between first UE 115 and second UE 340, second UE 340 may generate a second report 385. For example, second report 385 may be associated with measurement information, such as measurement information 356, generated by second UE 340 based on one or more PRSs 383. In some implementations, second report 385 may be generated based on the report format indicated by first UE 115 to second UE 340. In some implementations, second report 385 may include the measurement information, a location of second UE 340, a motion station (e.g., in motion or not in motion) of second UE 340, or a combination thereof. Second UE 340 may transmit second report 385 to first UE 115. For example, second UE 340, after communication of one or more PRSs 383 between first UE 115 and second UE 340, may transmit second report 385 to first UE 115. First UE 115 may receive second report 385 from second UE 340.

First UE may, based on first report 384, second report 385, or a combination thereof, determine position information, such as position information 308. For example, first UE 115 may determine a value associated with a distance between first UE 115 and second UE 340, a location of first UE 115, a location of second UE 340, or a combination thereof.

In some implementations, first UE 115 or second UE 340 may transmit a termination message to end participation in the positioning session by first UE 115, a TRP of first UE 115, second UE 340, a TRP of second UE 340, or a combination thereof.

In some implementations, first UE 115 may receive a second request 390 for a second positioning session. Second request 390 may include or correspond to first request 380. Second request 390 may indicate that a multi-TRP positioning session is enabled. Based on second request 390, first UE 115 may generate and transmit second response 391. Second response 391 may include or correspond to second response 391.

In some implementations, third UE 370 may receive second response 391. After receiving second response 391, third UE 370 may generate and transmit a second parameter. The second parameter may include or correspond to first parameter 382. The second parameter may be received by first UE 115. After receipt of the second parameter by first UE 115, first UE 115 and third UE 370 may communicate one or more PRSs 383 between first UE 115 and third UE 370. The one or more PRSs may include or correspond to one or more PRSs 383. After communication of the one or more PRSs between first UE 115 and third UE 370, first UE 115 and third UE 370 may generate and exchange reports. The reports may include or correspond to first report 384, second report 385, or a combination thereof.

In some implementations, third UE 370 may receive first request 380 and may transmit a response based on first request 380. The response from third UE 370 may include or correspond to first response 381 or second response 391. For example, the response from third UE 370 may indicate one or more available TRPs of third UE 370. First UE 115 may receive the response from third UE 370 and may generate first parameter 382 based on the response from third UE 370. To illustrate, first parameter 382 may indicate an order of TRPs of second UE 340 and third UE 370 to receive PRSs 383 from one or more TRPs of first UE 115.

In some implementations, the positioning session between two UEs (or TRPs) may enable a range or distance to bet determined based on PRS round trip time (RTT) measurements. For example, each UE that participates in a positioning session may report an RTT measured to at least one other participating UE. For example, the RTT measured may be included in a report, such as first report 384 or second report 385. Additionally, or alternatively, each UE may also report its location if the UE knows its location. For two UEs that do not have knowledge of their position/location or have inaccurate knowledge of their position, the RTT measurement(s) may enable an inter-UE range between the two UEs. However, if one UE, such as an RSU, has accurate knowledge of its position, the range determined between the two UEs can correspond to an absolute position.

In some implementations, to establish a positioning session, an initiator UE (e.g., a UE that transmits a request for a positioning session), may transmit first parameter 382. The first parameter may indicate a number or list of target UEs (e.g., a UE that provided a response to the request), an order of target UEs, an earliest PRS transmit time, an offset associated with PRSs, or a combination thereof. In some implementations, a target UE may be identified or indicated in first parameter 382 based on a UE ID, a TRP ID, or a combination thereof. A target UE may determine a PRS transmission time based on first parameter 382. For example, the target UE may determine the PRS transmission time based on the number or list of target UEs, the order of target UEs, the earliest PRS transmit time, the offset associated with PRSs, or a combination thereof.

In some implementations, first request 380, first parameter 382, or other signaling may indicate a duration of the positioning session, whether or not the positioning session is periodic, or a combination thereof. Additionally, or alternatively, a stop or termination message may be transmitted by an initiator UE or a target UE to end the positioning session with respect to a UE, a TRP, or a combination thereof.

In some implementations, a report, such as first report 384 or second report 385, may include or indicate one or more measurements. For example, if an initiator UE has M TRPs (where M is a positive integer), and a target UE has N TRPs (where N is a positive integer), the target UE may report up to M*N time differences. A format for reporting one or more time differences may be indicated by the initiator UE, such as in first parameter 382. In some implementations, the target UE provides all the M*N time difference measurements. Additionally, or alternatively, the target UE may provide the first K best (where K is a positive integer and 1≤K≤M*N) measurements with the strongest RSRP, where K is a positive integer. Additionally, or alternatively, target UE is configured to discriminate between LoS and no line-of-sight (NLoS) measurements, and the target UE may report Q measurements (where Q is a positive integer and 1≤Q≤M*N) with LoS. Additionally, or alternatively, the target UE may report X measurements (where X is a positive integer and 1≤X≤M*N) and may or may not indicate which of them it is reporting. Additionally, or alternatively, the target UE provides a bit map of (M*N) measurements, where the target UE sets the bit map to be 1 for those measurements that it is reporting, and 0 for measurements not reported. As an illustrative, non-limiting example, in some implementations, if the initiator UE has M TRPs and the target UE has N TRPs, the target UE may provide all M*N time difference measurements, may provide a first K best measurements, may provide Q measurements with LoS, or any combination thereof.

In some implementations, the target UE may provide coordinates/locations of one or more of the TRP of the target UE, or a location/position of the target UE. For example, second UE 340 may provide first response 381 or second report 385 that includes or indicates coordinates/locations of one or more of TRPs 359 of second UE 340, a location/position of second UE 340, or a combination thereof. Providing such information may enable the initiator UE to perform localization (instead of mere ranging), even if the initiator UE has only one TRP, by leveraging the multiple ranging measurements and locations with the TRPs of the target UE.

In some implementations, to establish a positioning session for multiple TRPs, the initiator UE may explicitly provide the PRS broadcast times for one or more, or each, TRP of a target UE. For example, first UE 115 transmit may by first parameter 382 that includes or indicates an explicit PRS broadcast time for one or more TRPs of second UE 340. In some implementations, first UE 115 transmit may by first parameter 382 that includes or indicates an explicit PRS broadcast time for each TRPs of second UE 340. Additionally, or alternatively, the initiator UE may implicitly provide information to enable the target UE to determine one or more PRS broadcast times. For example, the information may include a number of TRPs that each target UE would be using for PRS transmission, an ordering of the target UEs, an order of TRPs that need to be used within a target UE, an initiator UE, a TRP earliest transmission time, or a combination thereof.

In some implementations, a periodic PRS sessions may be established for one or more TRPs and for one or more UEs participating in a multi-TRP positioning session. To illustrate, the initiator UE may configure a specific TRP to be used for a target UE, a PRS sequence for multiple TRPs, a period (e.g., in slots) with which TRPs must be transmitted, or a combination thereof. The initiator UE may transmit first parameter that includes or indicates a configuration of a specific TRP to be used for a target UE, a PRS sequence for multiple TRPs, a period (e.g., in slots) with which TRPs must be transmitted, or a combination thereof. Additionally, or alternatively, a positioning session may be de-established for one more specific TRPs or for one or more UEs participating in a positioning session based on a termination messages, such as an L2 message, transmitted by an initiator UE or a target UE during the positioning session.

In some implementations, the initiator UE receives one or more measurements, such as one or more RTT measurements, from one or more target UEs. For example, first UE 115 may receive second report 385 that includes the one or more measurements. The one or more measurements may include or correspond to measurement information 356. In some implementations, the initiator UE may identify the minimum of the one or more measurements (to account for Los/NLoS) and determine a range with or a distance from the target UE. Additionally, or alternatively, the initiator UE may determine a location of the initiator UE based on the locations/coordinates of one or more TRPs of the target UE, one or more determined distances between the initiator UE (e.g., a TRP of the initiator UE) and the target UE (e.g., a TRP of the target UE).

As described with reference to FIG. 3, the present disclosure provides techniques for multi-TRP based positioning. The techniques for multi-TRP based positioning may two UEs, such as first UE 115 and second UE 340, that do not have knowledge of their position/location or have inaccurate knowledge of their position, to determine an inter-UE range between the two UEs based on measurements associated with the positioning session. Additionally, if one UE has accurate knowledge of its position, the range determined between the two UEs based on the multi-TRP based positioning can correspond to an absolute position.

Figure 4:
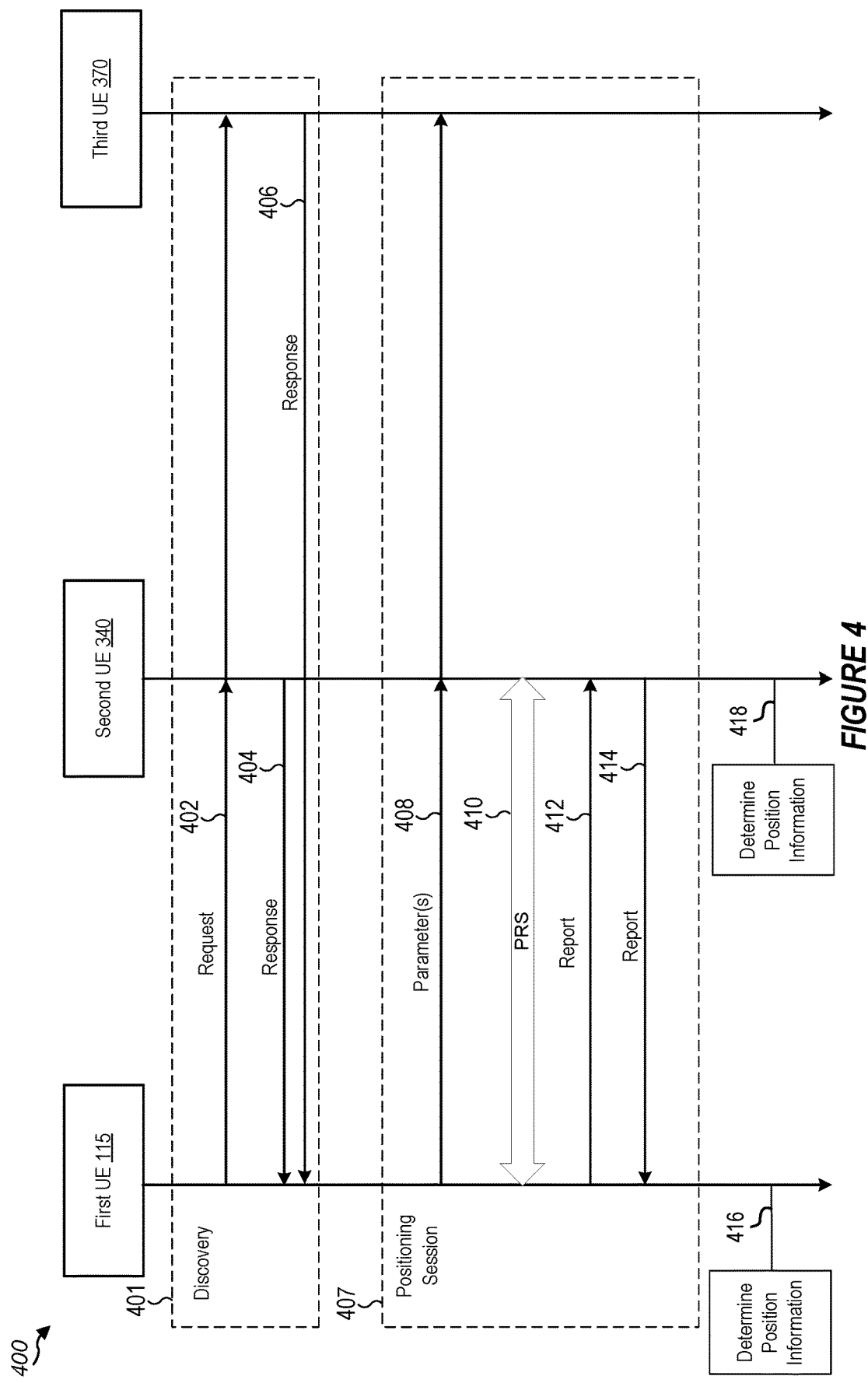
FIG. 4 is a ladder diagram illustrating an example wireless communication system that support multi-TRP based positioning according to one or more aspects.

FIG. 4 is a ladder diagram illustrating an example wireless communication system 400 that support multi-TRP based positioning according to one or more aspects. Wireless communication system 400 may include or correspond to wireless network 100 or wireless communications system 300.

As shown in FIG. 4, wireless communication system 400 includes first UE 115, second UE 340, and third UE 370. During operation of wireless communication system 400, at 401, a discovery phase or discovery protocol is performed.

The discovery phase or the discovery protocol is associated with a positioning session, which may be associated with a ranging protocol to determine a PRS RTT measurement. The discovery phase may include a request-response protocol or an announcement protocol. As shown, the discovery phase includes a request-response protocol.

At 402, first UE 115 transmits a request. For example, first UE 115 may transmit the request using one of TRPs 309. The request may include or correspond to first request 380 or second request 390. In some implementations, the request includes a request for a positioning session, such as a SL positioning session. The request may indicate that multi-TRP is enabled for the positioning session. The request may be unicast, multicast, or broadcast. In some implementations, a device that transmits the request may be referred to as an initiator device. The request may be received by second UE 340, third UE 370, or a both. In some implementations, a device that receives the request may be referred to as a target device.

At 404, second UE 340 transmits a first response. For example, second UE 340 may transmit the response using one of TRPs 359. The first response may include or correspond to first response 381 or second response 391. In some implementations, based on the request indicating that multi-TRP is enabled, second UE 340 may determine a number of TRPs of second UE 340 that are available for the positioning session. Additionally, or alternatively, second UE 340 may identify which TRPs of second UE 340 may be used for the positioning session. The first response may indicate the number of available TRPs of second UE 340, indicate which TRPs of second UE 340 may be used, indicate one or more positioning session parameters (e.g., a bandwidth, a channel, etc.), or a combination thereof. In some implementations, based on the request which does not indicate that multi-TRP is enabled, second UE 340 may transmit the first request that includes one or more parameters associated with the positioning session, such as a default single TRP session parameter. In some implementations, based on the request, second UE 340 may not transmit the first response or may transmit the first response and indicate that second UE 340 is unavailable to participate in the positioning session. The response may be unicast, multicast, or broadcast.

At 406, third UE 370 transmits a second response. For example, third UE 370 may transmit the response using a TRP of third UE 370. The second response may include or correspond to first response 381 or second response 391. In some implementations, based on the request indicating that multi-TRP is enabled, third UE 370 may determine a number of TRPs of third UE 370 that are available for the positioning session. Additionally, or alternatively, third UE 370 may identify which TRPs of third UE 370 may be used for the positioning session. The second response may indicate the number of available TRPs of third UE 370, indicate which TRPs of third UE 370 may be used, indicate one or more positioning session parameters (e.g., a bandwidth, a channel, etc.), or a combination thereof. In some implementations, based on the request which does not indicate that multi-TRP is enabled, third UE 370 may transmit the second request that includes one or more parameters associated with the positioning session, such as a default single TRP session parameter. In some implementations, based on the request, third UE 370 may not transmit the second response or may transmit the second response and indicate that third UE 370 is unavailable to participate in the positioning session. The response may be unicast, multicast, or broadcast.

At 407, during operation of wireless communication system 400, a positioning session is performed. In some implementations, the positioning session is a SL positioning session. At 408, first UE 115 may transmit one or more parameters associated with the positioning session. The one or more parameters may include or correspond to first parameter 382.

The one or more parameters may be unicast, multicast, or broadcast. In some implementations, first UE 115 may generate the one or more parameters based on one more TRPs of first UE 115 available for the positioning session, the first response, the second response, or a combination thereof. The one or more first parameters may indicate an order of PRS to be transmitted by first UE 115. Additionally, or alternatively, the one or more first parameters may indicate an order in which one or more TRPs of first UE 115 will be used to transmit one or more PRSs, an order of TRPs of second UE 340, third UE 370, or both, to receive one or more PRSs, or a combination thereof. In some implementations, the one or more parameters may indicate a report format associated with the positioning session.

In some implementations, the one or more parameters may indicate a frequency resource assignment, a time resource assignment, whether or not the positioning session is periodic, or a combination thereof for transmission of the one or more PRSs. For example, the one or more parameters may include or indicate, for at least one PRSs of the one or more PRSs of the positioning session, a physical resource block (PRB) assignment, a slot assignment, or a combination thereof. An example of a PRS resource assignment is described further herein at least with reference to FIG. 6. In some implementations, the one or more parameters may include or indicate, for each PRSs of the one or more PRSs of the positioning session, a physical resource block (PRB) assignment, a slot assignment, or a combination thereof. As another example, the one or more parameters may include or indicate, a PRB assignment, a slot assignment, or a combination thereof, for a first PRS of the one or more PRSs, and indicate an offset associated with the other PRSs of the one or more PRSs. The offset may be associated with a PRB offset, a resource element (RE) offset, a slot offset, or a combination thereof. To illustrate, a first PRS (e.g., an initial PRS) is transmitted at slot a and PRB b, where a and b are each positive integers. The rest of the PRSs may be transmitted at slot (a+lc), and at PRB (b+ld), where c and d are the time and PRB offsets respectively, and $l \in \{1, 2, \ldots m-1\}$, where is m a number of PRSs or a number of TRPs, such as a number of target TRPs.

In some implementations, after transmission of the one or more parameters, at 408, and prior to communication of one or more PRSs, at 410, second UE 340, third UE 370, or both may transmit another response to first UE 115. In some implementations, the other response may be based on the one or more parameters, at 408. Additionally, or alternatively, the other response may indicate whether or not second UE 340 (or a TRP of second UE 340) or third UE 370 (or a TRP of third UE 370) will participate in the positioning session.

At 410, first UE 115 and second UE 340 communicate one or more PRSs. The one or more PRSs may include or correspond to PRSs 383. The one or more PRSs may be unicast, multicast, or broadcast. In some implementations, at least one PRS of the one or more PRSs is transmitted in an unlicensed frequency band.

At 412, first UE 115 transmits a first report based on the one or more PRSs. The first report may include or correspond to first report 384. For example, the first report may include or indicate a first transmit time of a first PRS from first UE 115 to second UE 340, a first receive time of a second PRS, responsive to the first PRS, from second UE 340 to first UE 115, a difference between the first receive time and the first transmit time, or a combination thereof.

At 414, second UE 340 transmits a second report based on the one or more PRSs. The second report may include or correspond to second report 385. For example, the second report may include or indicate a second receive time of the first PRS from first UE 115 to second UE 340, a second transmit time of the second PRS, responsive to the first PRS, from second UE 340 to first UE 115, a difference between the second transmit time and the second transmit time, or a combination thereof.

At 416, first UE 115 determines position information. The position information determined by first UE 115 may include a distance or range between first UE 115 and second UE 340, a distance or rage between a TRP of first UE 115 and a TRP of second UE 340, a closest TRP of first UE 115 to second UE 340, a farthest TRP of first UE 115 to second UE 340, a closest TRP of second UE 340 to first UE 115, a farthest TRP of second UE 340 to first UE 115, or a combination thereof.

At 418, second UE 340 determines position information. The position information determined by second UE 340 may include a distance or range between first UE 115 and second UE 340, a distance or rage between a TRP of first UE 115 and a TRP of second UE 340, a closest TRP of first UE 115 to second UE 340, a farthest TRP of first UE 115 to second UE 340, a closest TRP of second UE 340 to first UE 115, a farthest TRP of second UE 340 to first UE 115, or a combination thereof.

It is noted that first UE 115 and third UE 370 do not communicate one or more PRSs at 410. For example, the second response, at 406, may have indicated that third UE 370 was not available to participate in the positioning session, the one or more parameters, at 408 may have not indicated that third UE 370 would participate in the positioning session, or a combination thereof. However, in other implementations, first UE 115 and third UE 370 may communicate one or more PRSs at 410 as part of the positioning session. In such implementations, first UE 115 and third UE 370 would also exchange reports. For example, the report transmitted by first UE 115, at 412, may include information may third UE 370, or first UE 115 may transmit another report that includes the information for third UE 370.

Figure 5:
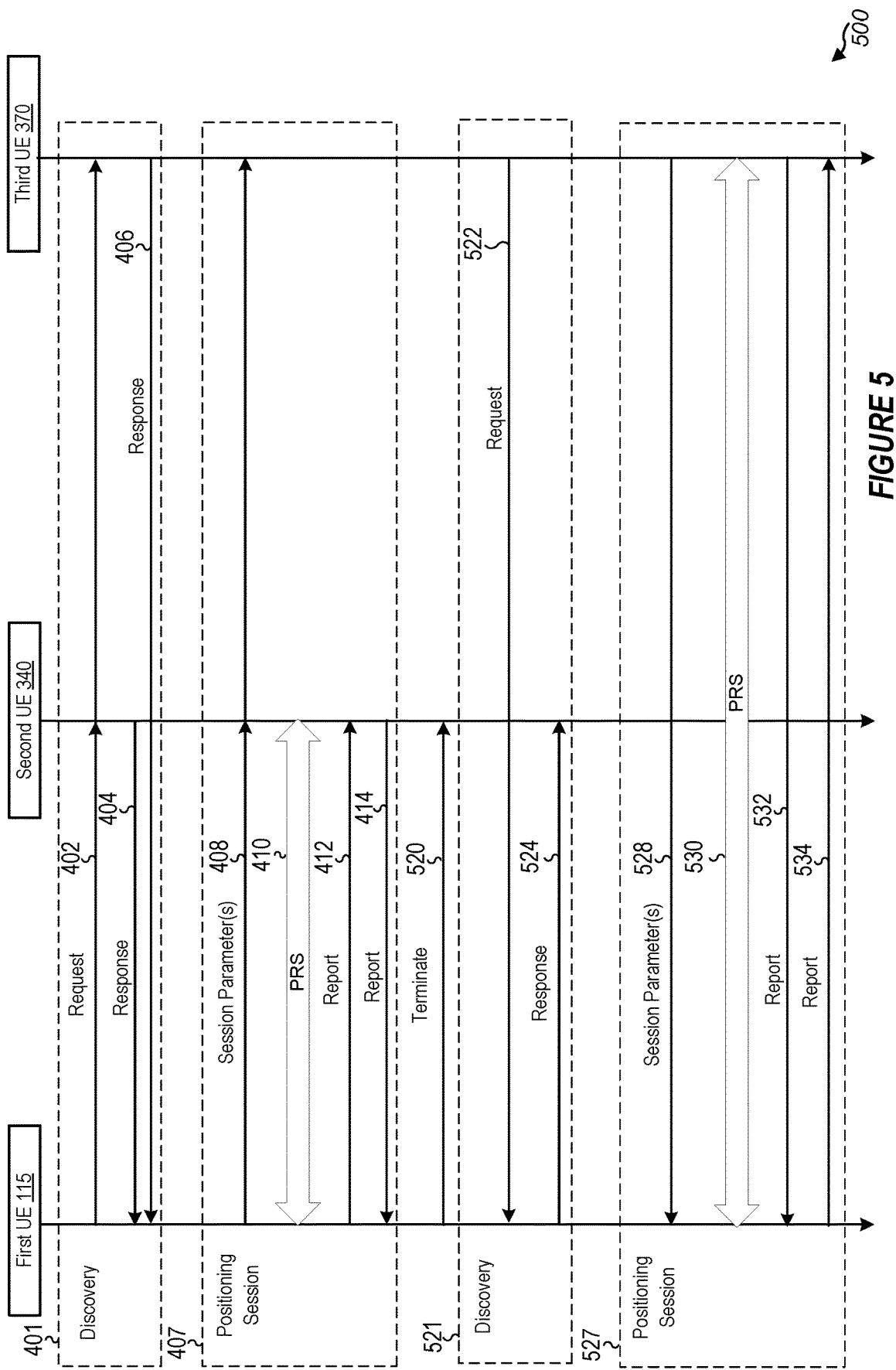
FIG. 5 is a ladder diagram illustrating an example wireless communication system that support multi-TRP based positioning according to one or more aspects.

FIG. 5 is a ladder diagram illustrating an example wireless communication system 500 that support multi-TRP based positioning according to one or more aspects. Wireless communication system 500 may include or correspond to wireless network 100, wireless communications system 300, or wireless communications system 400.

As shown in FIG. 5, wireless communication system 500 includes first UE 115, second UE 340, and third UE 370. During operation of wireless communication system 500, one or more operations may be performed as described with reference to at least FIG. 4.

After exchange of the report, at 412, and the report, at 414, first UE 115 may transmit a terminate message, at 520, to stop the positioning session between first UE 115 and second UE 340.

At 521, a discovery phase or discovery protocol is performed. The discovery phase or the discovery protocol is associated with a positioning session, which may be associated with a ranging protocol to determine a PRS RTT measurement. The discovery phase may include a request-response protocol or an announcement protocol. As shown, the discovery phase includes a request-response protocol.

At 522, third UE 370 transmits a request. For example, third UE 370 may transmit the request using a TRP of third UE 370. The request may include or correspond to first request 380 or second request 390. In some implementations, the request includes a request for a positioning session, such as a SL positioning session. The request may indicate that multi-TRP is enabled for the positioning session. The request may be unicast, multicast, or broadcast. The request may be received by first UE 115, second UE 340, or a both.

At 524, first UE 115 transmits a response. For example, first UE 115 may transmit the response using one of TRPs 309. The response may include or correspond to first response 381 or second response 391. In some implementations, based on the request indicating that multi-TRP is enabled, first UE 115 may determine a number of TRPs of first UE 115 that are available for the positioning session. Additionally, or alternatively, first UE 115 may identify which TRPs of first UE 115 may be used for the positioning session. The response may indicate the number of available TRPs of first UE 115, indicate which TRPs of first UE 115 may be used, indicate one or more positioning session parameters (e.g., a bandwidth, a channel, etc.), or a combination thereof. In some implementations, based on the request which does not indicate that multi-TRP is enabled, first UE 115 may transmit the request that includes one or more parameters associated with the positioning session, such as a default single TRP session parameter. In some implementations, based on the request, first UE 115 may not transmit the response or may transmit the first response and indicate that first UE 115 is unavailable to participate in the positioning session. The response may be unicast, multicast, or broadcast.

At 527, during operation of wireless communication system 500, a positioning session is performed. In some implementations, the positioning session is a SL positioning session.

At 528, third UE 370 transmits one or more parameters associated with the positioning session. The one or more parameters may include or correspond to first parameter 382. The one or more parameters may be unicast, multicast, or broadcast. In some implementations, third UE 370 may generate the one or more parameters based on one more TRPs of third UE 370 available for the positioning session, the response received from first UE 115, or a combination thereof. In some implementations, the one or more first parameters may indicate an order of PRS to be transmitted by third UE 370. Additionally, or alternatively, the one or more first parameters may indicate an order in which one or more TRPs of third UE 370 will be used to transmit one or more PRSs, an order of TRPs of first UE 115, to receive one or more PRSs, or a combination thereof. In some implementations, the one or more parameters may indicate a report format associated with the positioning session.

In some implementations, the one or more parameters may indicate a frequency resource assignment, a time resource assignment, whether or not the positioning session is periodic, or a combination thereof for transmission of the one or more PRSs. For example, the one or more parameters may include or indicate, for at least one PRSs of the one or more PRSs of the positioning session, a PRB assignment, a slot assignment, or a combination thereof. In some implementations, the one or more parameters may include or indicate, for each PRSs of the one or more PRSs of the positioning session, a PRB assignment, a slot assignment, or a combination thereof. As another example, the one or more parameters may include or indicate, a PRB assignment, a slot assignment, or a combination thereof, for a first PRS of the one or more PRSs, and indicate an offset associated with the other PRSs of the one or more PRSs.

At 530, first UE 115 and third UE 370 communicate one or more PRSs. The one or more PRSs may include or correspond to PRSs 383. The one or more PRSs may be unicast, multicast, or broadcast. In some implementations, at least one PRS of the one or more PRSs is transmitted in an unlicensed frequency band. In other implementations, each of the one or more PRSs is transmitted in the unlicensed frequency band.

At 532, third UE 370 transmits a first report based on the one or more PRSs. The first report may include or correspond to first report 384. For example, the first report may include or indicate a first transmit time of a first PRS from third UE 370 to first UE 115, a first receive time of a second PRS, responsive to the first PRS, from first UE 115 to third UE 370, a difference between the first receive time and the first transmit time, or a combination thereof.

At 534, first UE 115 transmits a second report based on the one or more PRSs. The second report may include or correspond to second report 385. For example, the second report may include or indicate a second receive time of the first PRS from third UE 370 to first UE 115, a second transmit time of the second PRS, responsive to the first PRS, from first UE 115 to third UE 370, a difference between the second transmit time and the second transmit time, or a combination thereof.

After receipt of the report, at 532, by first UE 115, first UE 115 may determine position information. The position information determined by first UE 115 may include a distance or range between first UE 115 and third UE 370, a distance or rage between a TRP of first UE 115 and a TRP of third UE 370, a closest TRP of first UE 115 to third UE 370, a farthest TRP of first UE 115 to third UE 370, a closest TRP of third UE 370 to first UE 115, a farthest TRP of third UE 370 to first UE 115, or a combination thereof.

After receipt of the report, at 534, by third UE 370, third UE 370 may determine position information. The position information determined by third UE 370 may include a distance or range between first UE 115 and third UE 370, a distance or rage between a TRP of first UE 115 and a TRP of third UE 370, a closest TRP of first UE 115 to third UE 370, a farthest TRP of first UE 115 to third UE 370, a closest TRP of third UE 370 to first UE 115, a farthest TRP of third UE 370 to first UE 115, or a combination thereof.

Figure 6:
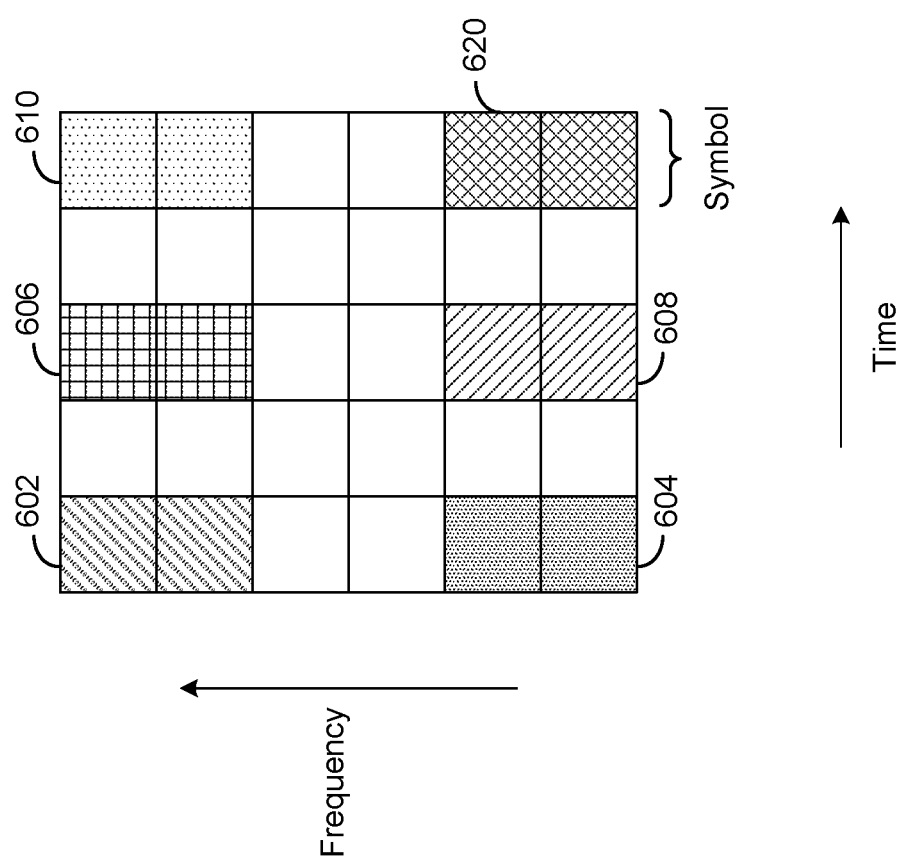
FIG. 6 is a diagram illustrating an example of a positioning reference signal resource for multiple transmission and reception points according to one or more aspects.

FIG. 6 is a diagram illustrating an example of a positioning reference signal (PRS) resource for multiple transmission and reception points (TRPs) according to one or more aspects. An indication of the PRS resource, such as a PRS transmission resource, include or correspond to first parameter 382.

As shown, the PRS resources are allocated based on frequency and time (e.g., a slot). Additionally, six different PRS resources are indicated which include a first resource 602, a second resource 604, a third resource 606, a fourth resource 608, a fifth resource 610 and a sixth resource 620.

In some implementations, each of the PRS resources may be associated with a TRP of an initiator device, such as a device that sends a request for a positioning session. For example, each of first resource 602, second resource 604, and third resource 606 may be associated with a first TRP, such as first TRP 310 of first UE 115, and each of fourth resource 608, fifth resource 610, and sixth resource 620 may be associated with a second TRP, such as second TRP 311 of first UE 115. Additionally, or alternatively, each of the PRS resources may be associated with a TRP of a target device, such as a device that sends a response to a request for the positioning session. As an illustrative, non-limiting example, first resource 602 and fourth resource 608 may be associated with a third TRP, such as first TRP 360 of second UE 340; second resource 604 and fifth resource 610 may be associated with a fourth TRP, such as second TRP 364 of second UE 340; and third resource 606 and sixth resource 620 may be associated with a fifth TRP, such a TRP of third UE 370.

Figure 7:
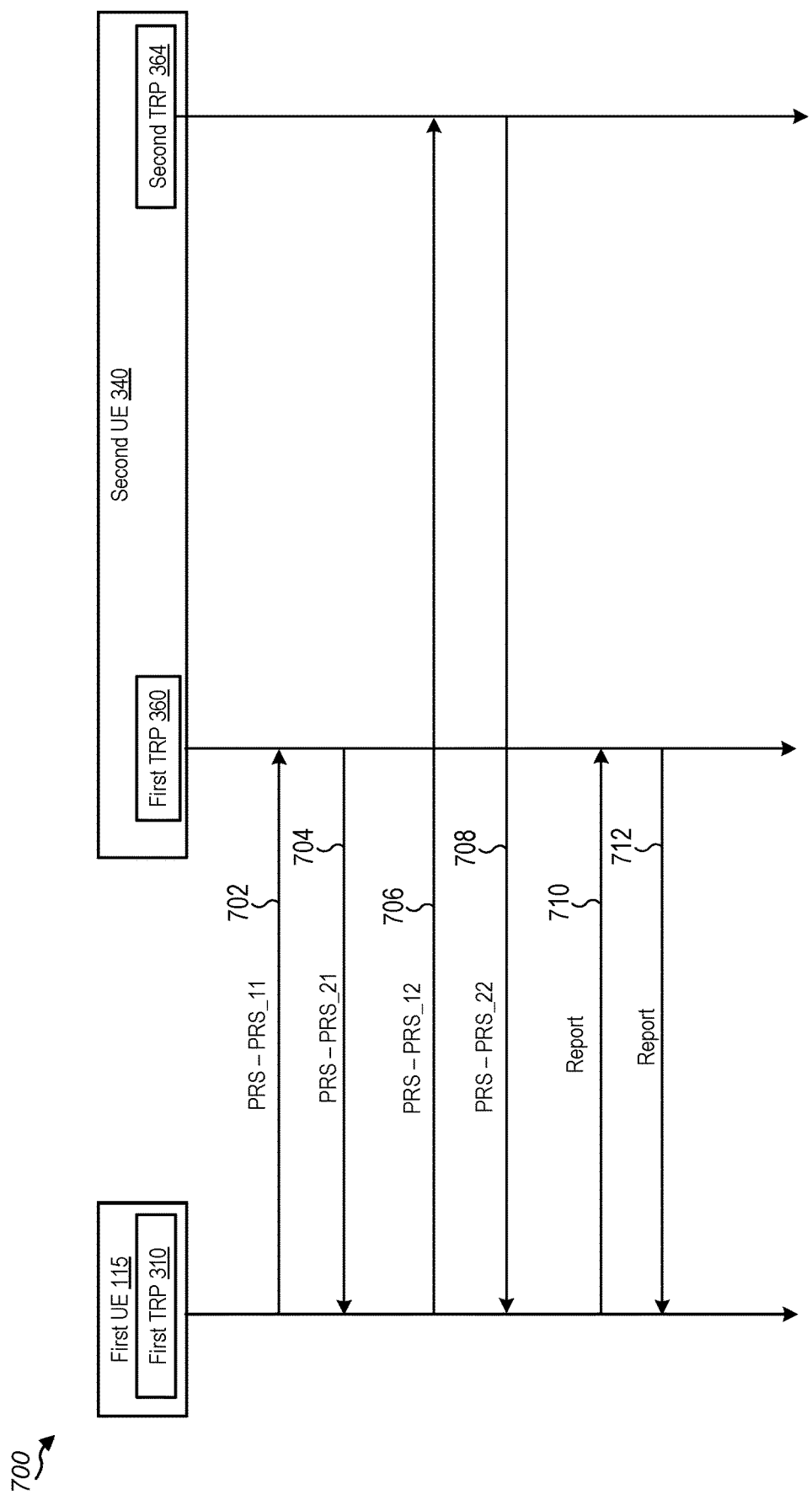
FIG. 7 is a ladder diagram illustrating an example wireless communication system that supports multi-TRP based positioning according to one or more aspects.

FIG. 7 is a ladder diagram illustrating an example wireless communication system 700 that support multi-TRP based positioning according to one or more aspects. Wireless communication system 700 may include or correspond to wireless network 100, wireless communications system 300, wireless communications system 400, or wireless communications system 500.

As shown in FIG. 7, wireless communication system 400 includes first UE 115 and second UE 340. First UE includes first TRP 310 and second UE 430 includes first TRP 360 and second TRP 364. In some implementations, wireless communication system 700 shows one or more operations associated with a positioning session. Additionally, one or more positioning reference signals (PRSs) described with reference to wireless communication system 700 may include or correspond to PRS(s) 383.

During operation of wireless communication system 700, at 702, first TRP 310 of first UE 115 transmits a first positioning reference signal (PRS-PRS_11) to first TRP 360 of second UE 340. For example, first UE 115 may unicast, multicast, or broadcast the first positioning reference signal (PRS-PRS_11). In some implementations, the first positioning reference signal (PRS-PRS_11) may be transmitted by first UE 115 at a time $T_{PRS11, TX}$ and may be received by second UE 340 at a time $T_{PRS11, RX}$.

At 704, first TRP 360 of second UE 340 transmits a second positioning reference signal (PRS-PRS_21) to first TRP 310 of first UE 115. For example, second UE 340 may unicast, multicast, or broadcast the second positioning reference signal (PRS-PRS_21). The second positioning reference signal (PRS-PRS_21) may be transmitted based on or in response to the first positioning reference signal (PRS-PRS_11). In some implementations, the second positioning reference signal (PRS-PRS_21) may be transmitted by second UE 340 at a time $T_{PRS21, TX}$ and may be received by first UE 115 at a time $T_{PRS21, RX}$.

At 706, first TRP 310 of first UE 115 transmits a third positioning reference signal (PRS-PRS_12) to second TRP 364 of second UE 340. For example, first UE 115 may unicast, multicast, or broadcast the third positioning reference signal (PRS-RS_12). In some implementations, the third positioning reference signal (PRS-PRS_12) may be transmitted by first UE 115 at a time $T_{PRS12, TX}$ and may be received by second UE 340 at a time $T_{PRS12, RX}$.

In some implementations, the first positioning reference signal (PRS-PRS_11) and the third positioning reference signal (PRS-PRS_12) are transmitted concurrently, such as at the same time or during the same slot. Additionally, or alternatively, the first positioning reference signal (PRS-PRS_11) and the third positioning reference signal (PRS-PRS_12) may be the same positioning reference signal.

At 708, second TRP 364 of second UE 340 transmits a fourth positioning reference signal (PRS-PRS_22) to first TRP 310 of first UE 115. For example, second UE 340 may unicast, multicast, or broadcast the fourth positioning reference signal (PRS-PRS_22). The fourth positioning reference signal (PRS-PRS_22) may be transmitted based on or in response to the third positioning reference signal (PRS-PRS_12). In some implementations, the fourth positioning reference signal (PRS-PRS_22) may be transmitted by second UE 340 at a time $T_{PRS22,\ TX}$ and may be received by first UE 115 at a time $T_{PRS12,\ TX}$.

At 710, first UE 115 transmits a first report to second UE 340. The first report may be unicast, multicast, or broadcast. The first report may include or correspond to first report 384. In some implementation, the first report includes or indicates time $T_{PRS11,\ TX}$, time $T_{PRS21,\ RX}$, $T_{PRS12,\ TX}$, $T_{PRS22,\ RX}$, a difference between $T_{PRS21,\ RX}$ and $T_{PRS11,\ TX}$ (e.g., $T_{PRS21,\ RX}-T_{PRS11,\ TX}$), a difference between $T_{PRS22,\ RX}$ and $T_{PRS12,\ TX}$ (e.g., $T_{PRS22,\ RX}-T_{PRS12,\ TX}$), a position of first UE 115, a location of first TRP 310, or a combination thereof.

At 712, second UE 340 transmits a second report to first UE 115 via first TRP 360 of second UE 340. The second report may be unicast, multicast, or broadcast. The second report may include or correspond to second report 385. In some implementation, the second report includes or indicates time $T_{PRS11,\ RX}$, time $T_{PRS21,\ TX}$, $T_{PRS12,\ RX}$, $T_{PRS22,\ TX}$, a difference between $T_{PRS11,\ RX}$ and $T_{PRS21,\ TX}$ (e.g., $T_{PRS11,\ RX}-T_{PRS21,\ TX}$), a difference between $T_{PRS22,\ TX}$ and $T_{PRS12,\ RX}$ (e.g., $T_{PRS12,\ RX}-T_{PRS22,\ TX}$), a position of second UE 340, a location of first TRP 360, a location of second TRP 364, or a combination thereof, such as position information 358.

After receipt of the first report, at 710, by second UE 340, second UE 340 may determine position information. Additionally, or alternatively, after receipt of the second report, at 712, by first UE 115, first UE 115 may determine position information, such as position information 308.

Figures 8, 9:
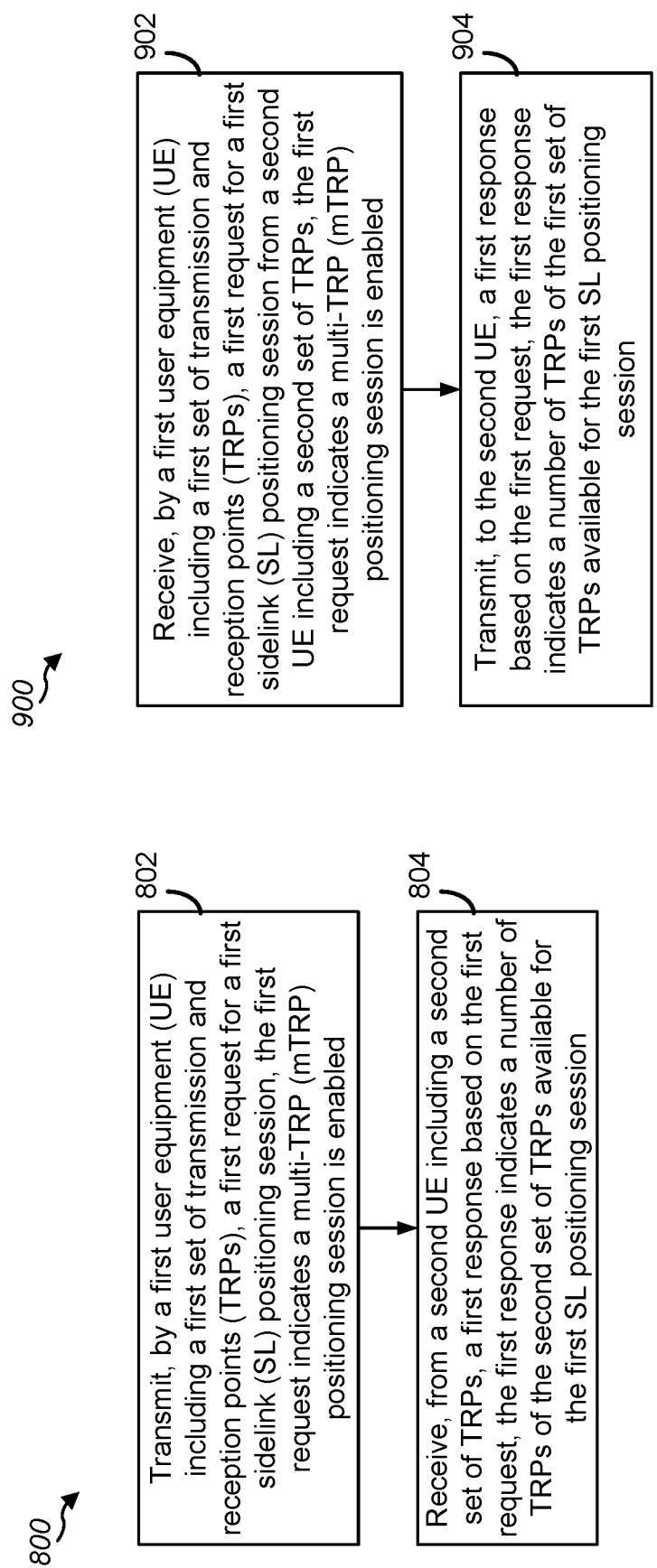
FIG. 8 is a flow diagram illustrating an example process that supports multi-TRP based positioning according to one or more aspects.
FIG. 9 is a flow diagram illustrating an example process that supports multi-TRP based positioning according to one or more aspects.
Figure 14:
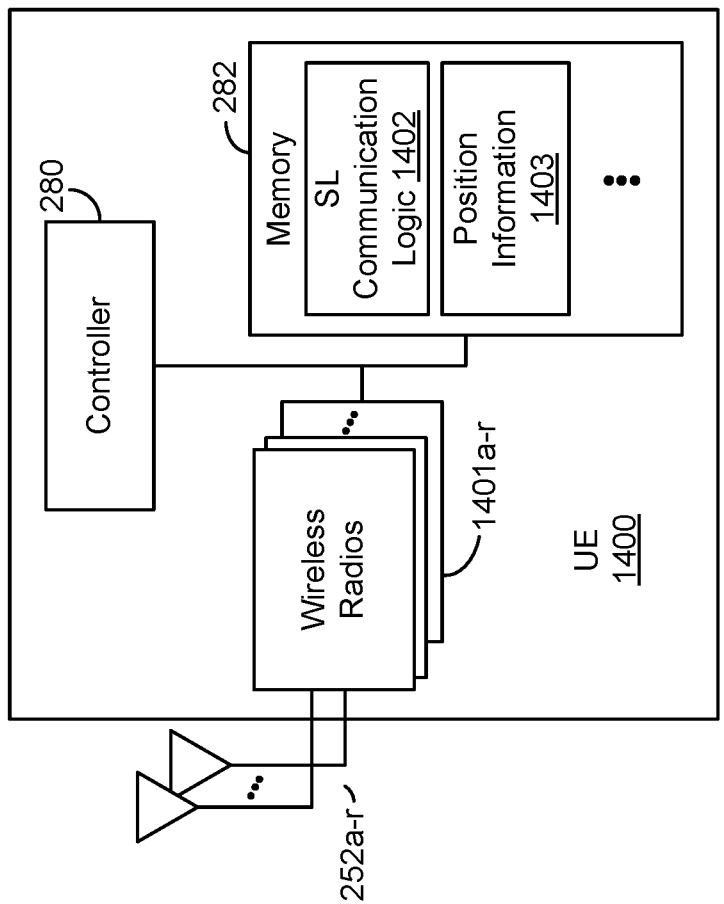
FIG. 14 is a block diagram of an example UE that supports multi-TRP based positioning according to one or more aspects.

FIG. 8 is a flow diagram illustrating an example process 800 that supports multi-TRP based positioning according to one or more aspects. Operations of process 800 may be performed by a first UE, such as first UE 115, second UE 340, or third UE 370, an RSU, an OBU, or a UE as illustrated in FIG. 14. For example, example operations of process 800 may enable UE 115 to support multi-TRP based positioning.

At block 802, the first UE transmits a first request for a first SL positioning session. The first UE may include or correspond to first UE 115. For example, the first request may include or correspond to first request 380. The first request indicates a multi-TRP positioning session is enabled. In some implementations, the first UE includes a first set of TRPs. The first set of TRPs may include or correspond to one or more TRPs 309, such as first TRP 310, second TRP 311, or a combination thereof.

At block 804, the first UE receives, from a second UE including a second set of TRPs, a first response based on the first request. For example, the first request may include or correspond to first request 380. The second UE may include or correspond to second UE 340. The second set of TRPs may include or correspond to one or more TRPs 359, such as first TRP 360, second TRP 364, or a combination thereof. The first response indicates a number of TRPs of the second set of TRPs available for the first SL positioning session.

In some implementations, the first UE may transmit one or more first parameters associated with the first SL positioning session. For example, the one or more first parameters may include or correspond to first parameter 382. The one or more first parameters may indicate an order of use, by the second UE during the first SL positioning session, of one or more TRPs of the second set of TRPs of the second UE. The one or more TRPs are associated with the number of TRPs of the second set of TRPs. Additionally, or alternatively, the one or more parameters may indicate, a report format associated with measurement information, such as the measurement information based on one or more PRSs between the first UE and the second UE during the first SL positioning session. The measurement information may include or correspond to measurement information 306 or measurement information 356.

In some implementations, the one or more first parameters may indicate, for the first SL positioning session, for each TRP of the one or more TRPs of the second UE, a PRB assignment, a slot assignment, or a combination thereof. In some other implementations, the one or more first parameters may indicate, for the first SL positioning session and for an initial TRP of the order, a PRB assignment, a slot assignment, or a combination thereof. Additionally, or alternatively, the one or more parameters may indicate, for each TRP of the order other than the initial TRP, an offset value.

In some implementations, the first UE and the second UE may communicate one or more PRSs between the first UE and the second UE. For example, the one or more PRSs may include or correspond to PRS(s) 383. The first UE, after communication of the one or more PRSs between the first UE and the second UE, may generate a first report to the second UE. For example, the first report may include or correspond to first report 384. In some implementations, the first report may be generated based on the report format indicated by the first UE to the second UE. The first UE, after communication of the one or more PRSs between the first UE and the second UE, may transmit the first report to the second UE. The first report may be associated with measurement information, such as measurement information 306, generated by the first UE based on the one or more PRSs. Additionally, or alternatively, the first UE, after communication of the one or more PRSs between the first UE and the second UE, may receive a second report from the second UE. For example, the second report may include or correspond to second report 385. The second report may be associated with measurement information, such as measurement information 356, generated by the second UE based on the one or more PRSs.

In some implementations, the second report may indicate, for each PRS received by the second UE from the first UE during the first SL positioning session, a time difference measurement. Additionally, or alternatively, the second report may indicate, for one or more PRSs received by the second UE from the first UE during the first SL positioning session, a first number of time difference measurements having a highest RSRP. Additionally, or alternatively, the second report may indicate, for one or more PRSs received by the second UE from the first UE during the first SL positioning session, a second number of time difference measurements associated with an LoS between the first UE and the second UE.

In some implementations, the first UE may, based on the second report, determine position information. For example, the position information may include or correspond to position information 308. To illustrate, to determine the position information, the first UE may determine a value associated with a distance between the first UE and the second UE, a location of the first UE, a location of the second UE, or a combination thereof.

In some implementations, the first UE receives, from a third UE including a third set TRPs, a second request for a second SL positioning session. The third UE may include or correspond to third UE 370. The second request may include or correspond to second request 390. The second request may indicate a multi-TRP positioning session is enabled. In some implementations, the first UE may, based on the second request, determine a number of TRPs of the first set of TRPs available for the second SL positioning session.

Additionally, or alternatively, the first UE may transmitting, to the third UE, a second response. The second response may include or correspond to second response 391. The second response may indicate the number of TRPs of the first set of TRPs available for the second SL positioning session, a location of at least one TRP of the first set of TRPs, a position of the first UE, or a combination thereof.

In some implementations, the first UE receives, from the third UE, one or more second parameters associated with the second SL positioning session. The one or more second parameters may include or indicate an order of use, by the first UE during the second SL positioning session, of one or more TRPs of the first set of TRPs of the first UE. The one or more TRPs of the first set of TRPs associated with the number of TRPs of the first set of TRPs. Additionally, or alternatively, the one or more second parameters may include or indicate a report format associated with measurement information. The measurement information may be based on one or more PRSs between the first UE and the third UE during the second SL positioning session.

In some implementations, the first UE may communicate one or more PRSs between the first UE and the third UE during the second SL positioning session. Additionally, or alternatively, the first UE may receive a third report from the third UE. The third report may have a report format that is based on or associated with the report format indicated by the third UE to the first UE. In some implementations, the first UE may generate, based on the report format and the one or PRSs, a fourth report that indicates, for each PRS received by the first UE from the third UE during the second SL positioning session, a time difference measurement. Additionally, or alternatively, the first UE may generate, based on the report format and the one or PRSs, the fourth report that indicates, for the one or more PRSs received by the first UE from the third UE during the second SL positioning session, a first number of time difference measurements having a highest RSRP or a second number of time difference measurements associated with an LoS between the first UE and the third UE.

In some implementations, the first UE transmits the fourth report to the third UE. Based on the third report, the first UE may determine a value associated with a distance between the first UE and the third UE, a location of first UE, or a combination thereof. Additionally, or alternatively, the first UE may receive, from the third UE, a termination message associated with the second SL positioning session. The termination message may indicate to terminate the second SL positioning session or use of a TRP of the first UE or the third UE during the second SL positioning session.

FIG. 9 is a flow diagram illustrating an example process 900 that supports multi-TRP based positioning according to one or more aspects. Operations of process 900 may be performed by a first UE, such as first UE 115, second UE 340, or third UE 370, an RSU, an OBU, or a UE as illustrated in FIG. 14. For example, example operations of process 900 may enable UE 115 to support multi-TRP based positioning.

At block 902, the first UE receives, by a first UE including a first set of TRPs, a first request for a first SL positioning session from a second UE including a second set of TRPs. For example, the first UE and the first set of TRPs may include or correspond to second UE 340 and TRPs 359, respectively. The second UE and the second set of TRPs may include or correspond to first UE 115 and TRPs 309, respective. The first request may include or correspond to first request 380. The first request may indicate a multi-TRP positioning session is enabled.

At block 904, the first UE transmit, to the second UE, a first response based on the first request. For example, the first response may include or correspond to first response 381. The first response may indicate a number of TRPs of the first set of TRPs available for the first SL positioning session, a location of one or more TRPs of the first set of TRPs, a position of the first UE, or a combination thereof.

The first UE may receive, from the second UE, one or more first parameters associated with the first SL positioning session. The one or more first parameters may include or correspond to first parameter 382. The one or more first parameters indicate, an order of use, by the first UE during the first SL positioning session, of one or more TRPs of the first set of TRPs of the first UE, a report format associated with measurement information, or a combination thereof. The order may include or correspond to schedule information 357. The measurement information may include or correspond to measurement information 356. The one or more TRPs of the first set of TRPs may be associated with the number of TRPs of the first set of TRPs. The measurement information may be based on one or more PRSs between the first UE and the second UE during the first SL positioning session. The one or more PRSs may include or correspond to PRS 383.

In some implementations, the first UE may communicate one or more PRSs (e.g., PRS 383) between the first UE and the second UE during the first SL positioning session. Additionally, or alternatively, the first UE may receive a first report from the second UE. The first report may include or correspond to first report 384.

In some implementations, the first UE may generate, based on the report format and the one or PRSs, a second report that includes or indicates, for each PRS received by the first UE from the second UE during the first SL positioning session, a time difference measurement. The second report may include or correspond to second report 385. The time difference measurement may include or correspond to or measurement information 356. Additionally, or alternatively, the second report may include or indicate, for the one or more PRSs received by the first UE from the second UE during the first SL positioning session, a first number of time difference measurements having a highest RSRP, or a second number of time difference measurements associated with an LoS between the first UE and the second UE. In some implementations, the first UE transmits the second report to the second UE.

In some implementations, based on the third report, the first UE may determine a value associated with a distance between the first UE and the second UE, a position of first UE, or a combination thereof. Additionally, or alternatively, the first UE may receive, from the second UE, a termination message associated with the first SL positioning session. The termination message may indicate to terminate the first SL positioning session or use of a TRP of the first UE or the second UE during the second SL positioning session. Alternatively, the first UE may transmit, to the second UE, the termination message associated with the first SL positioning session.

In some implementations, the first UE may receiving, from a third UE including a third set TRPs, a second request for a second SL positioning session. For example, the third UE may include or correspond to third UE 370. The second request may include or correspond to second request 390. The second request may indicates a multi-TRP positioning session is enabled. Base on the second request, the first UE may determine a number of TRPs of the first set of TRPs available for the second SL positioning session. In some implementations, the first UE may transmit, to the third UE, a second response.

The second response may include or correspond to second response 391. The second response may indicate the number of TRPs of the first set of TRPs available for the second SL positioning session, a location of at least one TRP of the first set of TRPs, a position of the first UE, or a combination thereof. The first UE may receive, from the third UE, one or more second parameters associated with the second SL positioning session. The one or more second parameters indicate, an order of use, by the first UE during the second SL positioning session, of one or more TRPs of the first set of TRPs of the first UE, a report format associated with measurement information, or a combination thereof. The one or more TRPs of the first set of TRPs may be associated with the number of TRPs of the first set of TRPs. The measurement information based on one or more PRSs between the first UE and the third UE during the second SL positioning session.

In some implementations, the first UE may communicate one or more PRSs between the first UE and the third UE during the second SL positioning session. Additionally, or alternatively, the first UE may receive a third report from the third UE.

In some implementations, the first UE may generate, based on the report format and the one or PRSs, a fourth report that includes or indicates, for each PRS received by the first UE from the third UE during the second SL positioning session, a time difference measurement. Additionally, or alternatively, the fourth report may include or indicate, for the one or more PRSs received by the first UE from the third UE during the second SL positioning session, a first number of time difference measurements having a highest RSRP, or a second number of time difference measurements associated with an LoS between the first UE and the third UE.

In some implementations, the first UE transmits the fourth report to the third UE. Based on the third report, the first UE may determine a value associated with a distance between the first UE and the third UE, a location of first UE, or a combination thereof. Additionally, or alternatively, the first UE may receive, from the third UE, a termination message associated with the second SL positioning session. The termination message may indicate to terminate the second SL positioning session or use of a TRP of the first UE or the third UE during the second SL positioning session.

FIG. 10 is a flow diagram illustrating an example process 1000 that supports multi-TRP based positioning according to one or more aspects. Operations of process 1000 may be performed by a first UE, such as first UE 115, second UE 340, or third UE 370, an RSU, an OBU, or a UE as illustrated in FIG. 14. For example, example operations of process 1000 may enable UE 115 to support multi-TRP based positioning.

At block 1002, the first UE receives, by the first UE including a first set of TRPs, a first response based on a first request for a first SL positioning session. For example, the first UE and the first set of TRPs may include or correspond to first UE and TRPs 309, respectively. The first request and the first response may include or correspond to first request 380 and first response 381, respectively. The first SL positioning session may include or correspond a multi-TRP positioning session. The first response may be received from a second UE including a second set of TRPs. The second UE and the second set of TRPs may include or correspond to second UE 340 and TRPs 359. The first response may indicate a number of TRPs of the second set of TRPs available for the first SL positioning session.

At block 1004, the first UE transmits one or more first parameters associated with the first SL positioning session. The one or more first parameters may include or correspond to first parameter 382. The one or more first parameters may indicate an order of use, by the second UE during the first SL positioning session, of one or more TRPs of the second set of TRPs of the second UE. The order may include or correspond to schedule information 307, schedule information 357, or a combination thereof. In some implementations, the one or more TRPs associated with the number of TRPs of the second set of TRPs.

FIG. 11 is a flow diagram illustrating an example process 1100 that supports multi-TRP based positioning according to one or more aspects. Operations of process 1100 may be performed by a first UE, such as first UE 115, second UE 340, or third UE 370, an RSU, an OBU, or a UE as illustrated in FIG. 14. For example, example operations of process 1100 may enable UE 115 to support multi-TRP based positioning.

At block 1102, a first UE transmits, to a second UE, a first response based on a first request for a first SL positioning session. For example, the first UE and the second UE may include or correspond to second UE 340 and first UE 115, respectively. The first UE including a first set of TRPs and the second UE including a second set of TRPs. The first set of TRPs of the first UE may include or correspond to TRPs 359. The second set of TRPs of the second UE may include or correspond to TRPs 309. The first response may indicate a number of TRPs of the first set of TRPs available for the first SL positioning session. In some implementations, the first SL positioning session may include a multi-TRP positioning session.

At block 1104, the first UE receives one or more first parameters associated with the first SL positioning session. For example, the one or more first parameters may include or correspond to first parameter 382. The one or more first parameters may indicate an order of use, by the first UE during the first SL positioning session, of one or more TRPs of the first set of TRPs of the first UE. For example, the order may include or correspond to schedule information 307 or schedule information 357. The one or more TRPs may be associated with the number of TRPs of the first set of TRPs.

FIG. 12 is a flow diagram illustrating an example process 1200 that supports multi-TRP based positioning according to one or more aspects. Operations of process 1200 may be performed by a first UE, such as first UE 115, second UE 340, or third UE 370, an RSU, an OBU, or a UE as illustrated in FIG. 14. For example, example operations of process 1200 may enable UE 115 to support multi-TRP based positioning.

At block 1202, the first UE communicates, during a first SL positioning session, one or more PRSs between the first UE including a first set of TRPs and a second UE including a second set of TRPs. The first UE and the first set of TRPs may include or correspond to first UE 115 and TRPs 309. The second UE and the second set of TRPs may include or correspond to second UE 340 and TRPs 359. The one or more PRSs may include or correspond to PRS 383. In some implementations, the first SL positioning session may include or correspond to a multi-TRP positioning session.

At block 1204, the first UE, after communicating the one or more PRSs between the first UE and the second UE, receives a report from the second UE. The report may include or correspond to second report 385. The report may be associated with measurement information generated by the second UE based on the one or more PRSs. For example, the measurement information may include or correspond to measurement information 306 or measurement information 356.

In some implementations, the report may indicates, for each PRS received by the second UE from the first UE during the first SL positioning session, a time difference measurement. Additionally, or alternatively, the report may indicate, for one or more PRSs received by the second UE from the first UE during the first SL positioning session a first number of time difference measurements having a highest RSRP, or a second number of time difference measurements associated with an LoS between the first UE and the second UE.

FIG. 13 is a flow diagram illustrating an example process 1300 that supports multi-TRP based positioning according to one or more aspects. Operations of process 1300 may be performed by a first UE, such as first UE 115, second UE 340, or third UE 370, an RSU, an OBU, or a UE as illustrated in FIG. 14. For example, example operations of process 1300 may enable UE 115 to support multi-TRP based positioning.

At block 1302, a first UE communicates, during a first SL positioning session, one or more PRSs between the UE including a first set of TRPs and a second UE including a second set of TRPs. The first UE and the first set of TRPs may include or correspond to second UE 340 and TRPs 359. The second UE and the second set of TRPs may include or correspond to first UE 115 and TRPs 309. The one or more PRSs may include or correspond to PRS 383. In some implementations, the first SL positioning session may include or correspond to a multi-TRP positioning session.

At block 1304, the first UE transmits, after communicating the one or more PRSs between the first UE and the second UE, a report to the second UE. The report may include or correspond to second report 385. The report may be associated with measurement information generated by the second UE based on the one or more PRSs. For example, the measurement information may include or correspond to measurement information 306 or measurement information 356.

In some implementations, the report may indicates, for each PRS received by the second UE from the first UE during the first SL positioning session, a time difference measurement. Additionally, or alternatively, the report may indicate, for one or more PRSs received by the second UE from the first UE during the first SL positioning session a first number of time difference measurements having a highest RSRP, or a second number of time difference measurements associated with an LoS between the first UE and the second UE.

FIG. 14 is a block diagram of an example UE 1400 that supports multi-TRP based positioning according to one or more aspects. UE 1400 may be configured to perform operations, including the blocks of a process described with reference to one or more of FIGS. 8-13. In some implementations, UE 1400 includes the structure, hardware, and components shown and described with reference to UE 115 of FIGS. 1-3. For example, UE 1400 includes controller 280, which operates to execute logic or computer instructions stored in memory 282, as well as controlling the components of UE 1400 that provide the features and functionality of UE 1400. UE 1400, under control of controller 280, transmits and receives signals via wireless radios 1401a-r and antennas 252a-r. Wireless radios 1401a-r include various components and hardware, as illustrated in FIG. 2 for UE 115, including modulator and demodulators 254a-r, MIMO detector 256, receive processor 258, transmit processor 264, and TX MIMO processor 266. In some implementations, wireless radios 1401a-r may include or correspond to TRPs 309, TRPs 359, or a combination thereof.

As shown, memory 282 may include SL communication logic 1402 and position information 1403. SL communication logic 1402 may include or correspond to processor 302, instructions 305, processor 352, instructions 355, or a combination thereof. Position information 1403 may include or correspond to measurement information 306, position information 308, measurement information 356, position information 358, or a combination thereof. UE 1400 may receive signals from or transmit signals to one or more network entities, such as base station 105 of FIGS. 1-2, a UE, such as UE 115, second UE 340, or third UE 370.

It is noted that one or more blocks (or operations) described with reference to FIGS. 8-13 may be combined with one or more blocks (or operations) described with reference to another of the figures. For example, one or more blocks (or operations) of FIG. 8 may be combined with one or more blocks (or operations) of FIG. 9. As another example, one or more blocks associated with FIG. 8 may be combined with one or more blocks associated with FIG. 10. As another example, one or more blocks associated with FIG. 9 may be combined with one or more blocks associated with FIG. 11. As another example, one or more blocks associated with FIG. 8-13 may be combined with one or more blocks (or operations) associated with FIGS. 1-7. Additionally, or alternatively, one or more operations described above with reference to FIGS. 1-7 may be combined with one or more operations described with reference to FIGS. 8-13.

In one or more aspects, techniques for supporting multi-TRP based positioning may include additional aspects, such as any single aspect or any combination of aspects described below or in connection with one or more other processes or devices described elsewhere herein. In a first aspect, techniques for supporting multi-TRP based positioning may include transmitting, by a first UE including a first set of TRPs, a first request for a first SL positioning session. The first request may indicate a multi-TRP positioning session is enabled. The techniques may further include receiving, from a second UE including a second set of TRPs, a first response based on the first request. The first response may indicate a number of TRPs of the second set of TRPs available for the first SL positioning session. In some examples, the techniques in the first aspect may be implemented in a method or process. In some other examples, the techniques of the first aspect may be implemented in a wireless communication device such as a UE, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further include transmitting one or more first parameters associated with the first SL positioning session.

In a third aspect, in combination with the second aspect, the one or more first parameters indicate an order of use, by the second UE during the first SL positioning session, of one or more TRPs of the second set of TRPs of the second UE.

In a fourth aspect, in combination with the third aspect, the one or more TRPs associated with the number of TRPs of the second set of TRPs.

In a fifth aspect, in combination with the fourth aspect, the one or more first parameters further indicate, for the first SL positioning session: for each TRP of the one or more TRPs of the second UE, a PRB assignment, a slot assignment, or a combination thereof.

In a sixth aspect, in combination with the fourth aspect, the one or more first parameters further indicate, for the first SL positioning session and for an initial TRP of the order, a PRB assignment, a slot assignment, or a combination thereof.

In a seventh aspect, in combination with the sixth aspect, the one or more first parameters further indicate, for the first SL positioning session and for each TRP of the order other than the initial TRP, an offset value.

In an eighth aspect, in combination with the fourth aspect, the one or more first parameters further indicate a report format associated with measurement information.

In a ninth aspect, in combination with the eighth aspect, the measurement information based on one or more PRSs between the first UE and the second UE during the first SL positioning session.

In a tenth aspect, in combination with one or more of the first aspect through the ninth aspect, the techniques further include, after communication of one or more PRSs between the first UE and the second UE, transmitting a first report to the second UE, the first report associated with measurement information generated by the first UE based on the one or more PRSs.

In an eleventh aspect, in combination with the tenth aspect, the techniques further include, after communication of one or more PRSs between the first UE and the second UE, receiving a second report from the second UE, the second report associated with measurement information generated by the second UE based on the one or more PRSs.

In a twelfth aspect, in combination with the eleventh aspect, the second report indicates, for each PRS received by the second UE from the first UE during the first SL positioning session, a time difference measurement.

In a thirteenth aspect, in combination with the eleventh aspect or the twelfth aspect, the second report indicates, for one or more PRSs received by the second UE from the first UE during the first SL positioning session, a first number of time difference measurements having a highest RSRP.

In a fourteenth aspect, in combination with one or more of the eleventh aspect through the thirteenth aspect, the second report indicates, for one or more PRSs received by the second UE from the first UE during the first SL positioning session, a second number of time difference measurements associated with an LoS between the first UE and the second UE.

In a fifteenth aspect, in combination with the eleventh aspect, the techniques further include, based on the second report, determining a value associated with a distance between the first UE and the second UE, a location of the first UE, or a combination thereof.

In a sixteenth aspect, in combination with one or more of the first aspect through the fifteenth aspect, the techniques further include receiving, from a third UE including a third set TRPs, a second request for a second SL positioning session, the second request indicates an mTRP positioning session is enabled.

In a seventeenth aspect, in combination with the sixteenth aspect, the techniques further include, based on the second request, determining a number of TRPs of the first set of TRPs available for the second SL positioning session.

In an eighteenth aspect, in combination with the seventeenth aspect, the techniques further include transmitting, to the third UE, a second response.

In a nineteenth aspect, in combination with the eighteenth aspect, the second response indicates the number of TRPs of the first set of TRPs available for the second SL positioning session, a location of at least one TRP of the first set of TRPs, or a combination thereof.

In a twentieth aspect, in combination with the nineteenth aspect, the techniques further include receiving, from the third UE, one or more second parameters associated with the second SL positioning session.

In a twenty-first aspect, in combination with the twentieth aspect, the one or more second parameters indicate an order of use, by the first UE during the second SL positioning session, of one or more TRPs of the first set of TRPs of the first UE, the one or more TRPs of the first set of TRPs associated with the number of TRPs of the first set of TRPs.

In a twenty-second aspect, in combination with the twentieth aspect or the twenty-first aspect, the one or more second parameters indicate a report format associated with measurement information, the measurement information based on one or more PRSs between the first UE and the third UE during the second SL positioning session.

In a twenty-third aspect, in combination with one or more of the twentieth aspect through the twenty-second aspect, the techniques further include communicating one or more PRSs between the first UE and the third UE during the second SL positioning session.

In a twenty-fourth aspect, in combination with the twenty-third aspect, the techniques further include receiving a third report from the third UE.

In a twenty-fifth aspect, in combination with the twenty-fourth aspect, the techniques further include generating, based on the report format and the one or PRSs, a fourth report that indicates, for each PRS received by the first UE from the third UE during the second SL positioning session, a time difference measurement.

In a twenty-sixth aspect, in combination with the twenty-fourth aspect or the twenty-fifth aspect, the techniques further include generating, based on the report format and the one or PRSs, the fourth report that indicates, for the one or more PRSs received by the first UE from the third UE during the second SL positioning session, a first number of time difference measurements having a highest RSRP.

In a twenty-seventh aspect, in combination with one or more of the twenty-fourth through the twenty-sixth aspect, the techniques further include generating, based on the report format and the one or PRSs, the fourth report that indicates, for the one or more PRSs received by the first UE from the third UE during the second SL positioning session, a second number of time difference measurements associated with an LoS between the first UE and the third UE.

In a twenty-eighth aspect, in combination with the twenty-seventh aspect, the techniques further include transmitting the fourth report to the third UE.

In a twenty-ninth aspect, in combination with the twenty-eighth aspect, the techniques further include, based on the third report, determining a value associated with a distance between the first UE and the third UE, a location of first UE, or a combination thereof.

In a thirtieth aspect, in combination with the twenty-ninth aspect, the techniques further include receiving, from the third UE, a termination message associated with the second SL positioning session.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a first user equipment (UE), the method comprising:
    transmitting, by the first UE including a first set of transmission and reception points (TRPs), a first request for a first sidelink (SL) positioning session, the first request indicates a multiple-TRP (multi-TRP) positioning session is enabled;
    receiving, from a second UE including a second set of TRPs, a first response based on the first request, the first response indicates a number of TRPs of the second set of TRPs available for the first SL positioning session; and
    transmitting one or more first parameters associated with the first SL positioning session, the one or more first parameters indicate an order of use, by the second UE during the first SL positioning session, of one or more TRPs of the second set of TRPs of the second UE, the one or more TRPs associated with the number of TRPs of the second set of TRPs.

2. The method of claim 1, wherein the one or more first parameters further indicate, for the first SL positioning session:
    for each TRP of the one or more TRPs of the second UE, a physical resource block (PRB) assignment, a slot assignment, or a combination thereof.

3. The method of claim 1, wherein the one or more first parameters further indicate, for the first SL positioning session:
    for an initial TRP of the order, a physical resource block (PRB) assignment, a slot assignment, or a combination thereof, and for each TRP of the order other than the initial TRP, an offset value.

4. The method of claim 1, wherein the one or more first parameters further indicate a report format associated with measurement information, the measurement information based on one or more positioning reference signals (PRSs) between the first UE and the second UE during the first SL positioning session.

5. The method of claim 1, further comprising, after communication of one or more positioning reference signals (PRSs) between the first UE and the second UE:
    transmitting a first report to the second UE, the first report associated with measurement information generated by the first UE based on the one or more PRSs; and
    receiving a second report from the second UE, the second report associated with measurement information generated by the second UE based on the one or more PRSs.

6. The method of claim 5, wherein the second report indicates:
    for each PRS received by the second UE from the first UE during the first SL positioning session, a time difference measurement;
    for one or more PRSs received by the second UE from the first UE during the first SL positioning session:
        a first number of time difference measurements having a highest reference signal received power (RSRP); or
        a second number of time difference measurements associated with a line-of-sight (LoS) between the first UE and the second UE; or
    a combination thereof.

7. The method of claim 5, further comprising, based on the second report, determining a value associated with a distance between the first UE and the second UE, a location of the first UE, or a combination thereof.

8. The method of claim 1, further comprising:
receiving, from a third UE including a third set TRPs, a second request for a second SL positioning session, the second request indicates an mTRP positioning session is enabled;
based on the second request, determining a number of TRPs of the first set of TRPs available for the second SL positioning session;
transmitting, to the third UE, a second response, the second response indicates the number of TRPs of the first set of TRPs available for the second SL positioning session, a location of at least one TRP of the first set of TRPs, or a combination thereof; and
receiving, from the third UE, one or more second parameters associated with the second SL positioning session, the one or more second parameters indicate:
an order of use, by the first UE during the second SL positioning session, of one or more TRPs of the first set of TRPs of the first UE, the one or more TRPs of the first set of TRPs associated with the number of TRPs of the first set of TRPs,
a report format associated with measurement information, the measurement information based on one or more positioning reference signals (PRSs) between the first UE and the third UE during the second SL positioning session, or
a combination thereof.

9. The method of claim 8, further comprising:
communicating one or more PRSs between the first UE and the third UE during the second SL positioning session;
receiving a third report from the third UE;
generating, based on the report format and the one or PRSs, a fourth report that indicates:
for each PRS received by the first UE from the third UE during the second SL positioning session, a time difference measurement;
for the one or more PRSs received by the first UE from the third UE during the second SL positioning session:
a first number of time difference measurements having a highest reference signal received power (RSRP); or
a second number of time difference measurements associated with a line-of-sight (LoS) between the first UE and the third UE; or
a combination thereof;
transmitting the fourth report to the third UE;
based on the third report, determining a value associated with a distance between the first UE and the third UE, a location of first UE, or a combination thereof; and
receiving, from the third UE, a termination message associated with the second SL positioning session.

10. An apparatus comprising:
a first set of transmission and reception points (TRPs);
a memory storing processor-readable code; and
at least one processor coupled to the memory, the at least one processor configured to execute the processor-readable code to cause the at least one processor to:
transmit, via the first set of TRPs, a first request for a first sidelink (SL) positioning session, the first request indicates a multiple-TRP (multi-TRP) positioning session is enabled;
receive, via the first set of TRPs and from a first UE including a second set of TRPs, a first response based on the first request, the first response indicates a number of TRPs of the second set of TRPs available for the first SL positioning session; and
transmit one or more first parameters associated with the first SL positioning session, the one or more first parameters indicate an order of use, by the first UE during the first SL positioning session, of one or more TRPs of the second set of TRPs of the first UE, the one or more TRPs associated with the number of TRPs of the second set of TRPs.

11. The apparatus of claim 10, wherein the one or more first parameters further indicate, for the first SL positioning session:
for each TRP of the one or more TRPs of the first UE, a physical resource block (PRB) assignment, a slot assignment, or a combination thereof.

12. The apparatus of claim 10, wherein the one or more first parameters further indicate, for the first SL positioning session:
for an initial TRP of the order, a physical resource block (PRB) assignment, a slot assignment, or a combination thereof, and
for each TRP of the order other than the initial TRP, an offset value.

13. The apparatus of claim 10, wherein the one or more first parameters further indicate a report format associated with measurement information, the measurement information based on one or more positioning reference signals (PRSs) between the apparatus and the first UE during the first SL positioning session.

14. The apparatus of claim 10, wherein the at least one processor is further configured to execute the processor-readable code to cause the at least one processor to, after communication of one or more positioning reference signals (PRSs) between the apparatus and the first UE:
transmit a first report to the first UE, the first report associated with measurement information generated by the apparatus based on the one or more PRSs; and
receive a second report from the first UE, the second report associated with measurement information generated by the first UE based on the one or more PRSs.

15. The apparatus of claim 14, wherein the second report indicates:
for each PRS received by the first UE from the apparatus during the first SL positioning session, a time difference measurement;
for one or more PRSs received by the first UE from the apparatus during the first SL positioning session:
a first number of time difference measurements having a highest reference signal received power (RSRP); or
a second number of time difference measurements associated with a line-of-sight (LoS) between the apparatus and the first UE; or
a combination thereof.

16. The apparatus of claim 14, wherein the at least one processor is further configured to execute the processor-readable code to cause the at least one processor to, based on the second report, determine a value associated with a distance between the apparatus and the first UE, a location of the apparatus, or a combination thereof.

17. The apparatus of claim 10, wherein the at least one processor is further configured to execute the processor-readable code to cause the at least one processor to:

receive, from a second UE including a third set TRPs, a second request for a second SL positioning session, the second request indicates an mTRP positioning session is enabled;

based on the second request, determine a number of TRPs of the first set of TRPs available for the second SL positioning session;

transmit, to the second UE, a second response, the second response indicates the number of TRPs of the first set of TRPs available for the second SL positioning session, a location of at least one TRP of the first set of TRPs, or a combination thereof; and receive, from the second UE, one or more second parameters associated with the second SL positioning session, the one or more second parameters indicate:

an order of use, by the apparatus during the second SL positioning session, of one or more TRPs of the first set of TRPs of the apparatus, the one or more TRPs of the first set of TRPs associated with the number of TRPs of the first set of TRPs, a report format associated with measurement information, the measurement information based on one or more positioning reference signals (PRSs) between the apparatus and the second UE during the second SL positioning session, or a combination thereof.

18. The apparatus of claim 17, wherein the at least one processor is further configured to execute the processor-readable code to cause the at least one processor to:

communicate one or more PRSs between the apparatus and the second UE during the second SL positioning session;

generate, based on the report format and the one or PRSs, a second report that indicates:

for each PRS received by the apparatus from the second UE during the second SL positioning session, a time difference measurement;

for the one or more PRSs received by the apparatus from the second UE during the second SL positioning session:

a first number of time difference measurements having a highest reference signal received power (RSRP); or a second number of time difference measurements associated with a line-of-sight (LoS) between the apparatus and the second UE; or a combination thereof;

transmit the second report to the second UE;

receive a third report from the second UE;

based on the third report, determine a value associated with a distance between the apparatus and the second UE, a location of the apparatus, or a combination thereof; and receive, from the second UE, a termination message associated with the second SL positioning session.

19. An apparatus comprising:

means for generating a first request for a first sidelink (SL) positioning session, the first request indicates a multiple-transmission and reception point (multi-TRP) positioning session is enabled; and a first set of means for transmitting and receiving SL positioning information, at least one of the first set of means for transmitting and receiving is configured to:

transmit the first request;

receive, from a user equipment (UE) including a set of transmission and reception points (TRPs), a first response based on the first request, the first response indicates a number of TRPs of the set of TRPs available for the first SL positioning session; and transmit one or more first parameters associated with the first SL positioning session, the one or more first parameters indicate an order of use, by the UE during the first SL positioning session, of one or more TRPs of the set of TRPs of the UE, the one or more TRPs associated with the number of TRPs of the set of TRPs.

20. The apparatus of claim 19, wherein the one or more first parameters further indicate, for the first SL positioning session:

for each TRP of the one or more TRPs of the UE, a physical resource block (PRB) assignment, a slot assignment, or a combination thereof.

21. The apparatus of claim 19, wherein the one or more first parameters further indicate, for the first SL positioning session:

for an initial TRP of the order, a physical resource block (PRB) assignment, a slot assignment, or a combination thereof, and for each TRP of the order other than the initial TRP, an offset value.

22. The apparatus of claim 19, wherein:

the at least one of the first set of means for transmitting and receiving is further configured to, after communication of one or more positioning reference signals (PRSs) between the apparatus and the UE, receive a second report from the UE, the second report associated with measurement information generated by the UE based on the one or more PRSs; and the second report indicates:

for each PRS received by the UE from the apparatus during the first SL positioning session, a time difference measurement;

for one or more PRSs received by the UE from the apparatus during the first SL positioning session:

a first number of time difference measurements having a highest reference signal received power (RSRP); or a second number of time difference measurements associated with a line-of-sight (LoS) between the apparatus and the UE; or a combination thereof.

23. A non-transitory computer-readable medium storing instructions that, when executed by a processor, cause the processor to perform operations comprising:

transmitting, by a first user equipment (UE) including a first set of transmission and reception points (TRPs), a first request for a first sidelink (SL) positioning session, the first request indicates a multiple-TRP (multi-TRP) positioning session is enabled;

receiving, from a second UE including a second set of TRPs, a first response based on the first request, the first response indicates a number of TRPs of the second set of TRPs available for the first SL positioning session; and transmitting one or more first parameters associated with the first SL positioning session, the one or more first parameters indicate an order of use, by the second UE during the first SL positioning session, of one or more TRPs of the second set of TRPs of the second UE, the one or more TRPs associated with the number of TRPs of the second set of TRPs.

24. The non-transitory, computer-readable medium of claim 23, wherein the one or more first parameters further indicate, for the first SL positioning session:

for each TRP of the one or more TRPs of the second UE, a physical resource block (PRB) assignment, a slot assignment, or a combination thereof.

25. The non-transitory, computer-readable medium of claim 23, wherein the one or more first parameters further indicate, for the first SL positioning session:

for an initial TRP of the order, a physical resource block (PRB) assignment, a slot assignment, or a combination thereof, and for each TRP of the order other than the initial TRP, an offset value.

26. The non-transitory, computer-readable medium of claim 23, whether:

the operations further include, after communication of one or more positioning reference signals (PRSs) between the first UE and the second UE, receiving a second report from the second UE, the second report associated with measurement information generated by the second UE based on the one or more PRSs; and the second report indicates:

for each PRS received by the second UE from the first UE during the first SL positioning session, a time difference measurement;

for one or more PRSs received by the second UE from the first UE during the first SL positioning session:

a first number of time difference measurements having a highest reference signal received power (RSRP); or a second number of time difference measurements associated with a line-of-sight (LoS) between the first UE and the second UE; or a combination thereof.

* * * * *